United States Patent  
Gould et al.

(10) Patent No.: US 6,583,782 B1
(45) Date of Patent: Jun. 24, 2003

(54) VIRTUAL FORCE FEEDBACK INTERFACE

(75) Inventors: Eric Justin Gould, Austin, TX (US); Paulus W. Risnadi, Austin, TX (US); Tina Chia Ho, Plano, TX (US); S. Todd Wilkins, San Francisco, CA (US)

(73) Assignee: MONKEYmedia, Inc., Austin, TX (US)

( * ) Notice: Subject to any disclaimer, the term of this patent is extended or adjusted under 35 U.S.C. 154(b) by 0 days.

(21) Appl. No.: 09/488,616

(22) Filed: Jan. 20, 2000

Related U.S. Application Data

(63) Continuation of application No. 09/276,617, filed on Mar. 25, 1999, now Pat. No. 6,433,775.

(51) Int. Cl.[7] .................................................. G09G 5/08
(52) U.S. Cl. ........................ 345/157; 345/159; 345/862
(58) Field of Search ................................. 345/156, 157, 345/158, 161, 159, 163, 162, 781, 810, 835, 856–858, 862

(56) References Cited

U.S. PATENT DOCUMENTS

| 4,698,625 | A | * | 10/1987 | McCaskill et al. | 345/157 |
| 5,801,696 | A | * | 9/1998 | Roberts | 345/781 |
| 5,825,308 | A | * | 10/1998 | Rosenberg | 341/20 |
| 6,018,340 | A | * | 1/2000 | Butler et al. | 345/764 |
| 6,137,472 | A | * | 10/2000 | Pekelney et al. | 345/858 |
| 6,281,879 | B1 | * | 8/2001 | Graham | 345/157 |

* cited by examiner

*Primary Examiner*—Steven Saras
*Assistant Examiner*—Amr Awad
(74) *Attorney, Agent, or Firm*—Silicon Valley IP Group; Kevin J. Zilka; Dominic M. Kotab

(57) ABSTRACT

A method interfacing of a display and a pointing device employing regions of the display, sub-regions and objects with induced motion effects which alter the observed motion on the display of the content related to the pointing device are claimed. Induced motion effects include use of induced motion rules. The display may present one or more views of a 2-D, 3-D, 4-D or higher dimensional virtual space with regions, sub-regions and objects reflecting that dimensionality.

1 Claim, 24 Drawing Sheets

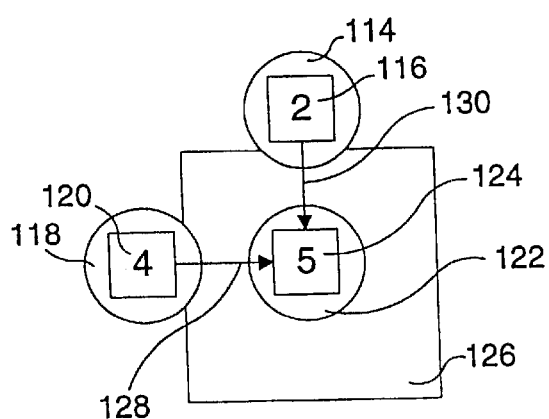
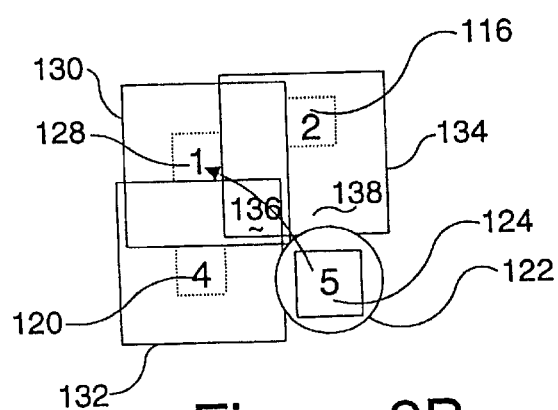
Figure 9A
Figure 9B
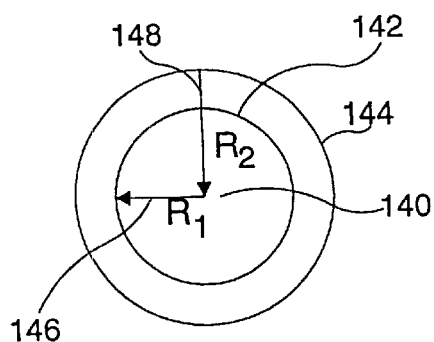
Figure 9C

Force in                Force out

| | Device history | Pointer history | Region objects |
|---|---|---|---|
| General friction | O | O | O |
| Directional friction | R | and/or R | O |
| Inertia | R | and/or R | O |
| Velocity | O | O | O |
| Acceleration | R | and/or R | O |
| Magnetism | R | and/or R | O |

O = optional    R = required

VIRTUAL FORCE FEEDBACK INTERFACE

This is a continuation of application Ser. No. 09/276,617, filed on Mar. 25, 1999, U.S. Pat. No. 6,433,775.

BACKGROUND OF THE INVENTION

This invention relates to feedback affecting a computer display device with regards to motion of a pointing device interfaces to that computer.

The prior art teaches for methodologies interactions between a display device 10 and a pointing device 12 (see FIG. 1). There has been a continual evolution of content and interface regarding these two components resulting in mechanisms including windowing systems. Such windowing systems are often composed of a region (window) of the display device, further composed of sub-regions. These sub-regions include, by way of illustration, buttons, pull-down menus and icons activating specific window functions. These window functions often include but are not limited to opening and saving files, numeric and operator buttons on calculator and spreadsheet applications, copying, cutting and pasting highlighted material within the window to a clipboard.

Human physiology is inherently imprecise, as evidenced by an examination of raw sensor data from a mouse. This data is usually very "ragged". Operating systems and in particular, pointing device drivers, including mouse drivers, often possess built-in acceleration curves to smooth out these discontinuities on a global scale.

There are a number of situations regarding windowing systems in general when there is a need to reduce background mechanical noise with regards to pointing device movement. Illustrative examples include users with limited coordination, such as the very young as well as people possessing limited mechanical control of the pointing device. Such limited mechanical control can be additionally caused by background noise, such as using a notebook computer on a bumpy airplane or transit ride. Existing interfaces lack sufficient noise reduction support, causing users to lose productivity in such circumstances.

A further limitation to existing interfaces is a lack of readily accessible control of pointers as they approach the boundary of a display region such as a window. In a number of applications including multimedia players, as the user moves the pointing device further and further in a given direction, the action should continue, even if it is at the boundary of the display region. The application developer should have control of what happens in such situations, rather than be governed by decisions made by the operating system designers. Form should best follow function, allowing the application developer the freedom to express the response of the pointer with regards to the display system in a manner consistent with the interaction with the user's activity with the pointing device.

Other evolutionary results include display mechanisms for 2-D, 3-D and 4-D systems utilizing one or more specific perspectives, views or projections onto specific planes. Such multidimensional displays often map from a virtual region containing sub-regions and representing the pointing device as having an associated virtual pointer location relative to the virtual region. Such pointers may or may not be visible on the display device. When visible, they often appear as a cursor. There is a need in many of these systems to alter the overall motion of the pointer based upon some or all of the sub-regions the pointer is traversing. Such alterations include but are not limited to the portrayal of friction, currents, attraction and repulsion, impulsive and inertial motion effects induced on the pointer by proximity to one or more traversed sub-regions, and thus affecting the display.

In 2-D and 3-D system display mechanisms, there is an option of using direct force feedback pointing devices, which has prior art, particularly in the 2-D situation.

Such pointing devices tend to cost more than standard pointing devices and also to be subject to the same problems of background mechanical noise as discussed above.

The mechanical complexity, and consequently, the cost for 3-D implementations is significantly greater than for 2-D implementations. There are no known direct feedback mechanisms for higher than 3-D system interfaces.

Prior art system interfaces incorporating a pointing device and display often further incorporate a user interface to calibrate the pointing device. On a number of systems including Windows systems, such user calibration tends to be known as control panels. A correlation factor between displaced movement of the pointing device and resulting movement of a displayed cursor is a common calibration control in such interfaces. This is a worthwhile basic user interface control, but it does not permit for the calibration of friction or traction based upon traversing various sub-regions, nor any form of attraction nor inertia.

Further, some prior art interfaces have shown a slowing effect when traversing a specific sub-region. This has most notably been seen in a slowing when crossing the "OK" button and "Cancel" button on certain prompt windows in the Microsoft Windows operating systems. While this is an improvement, it does not tend to filter out background mechanical noise as discussed above. It is further not available to developers to control for other graphical interface elements, such as other kinds of controls, pull down menus, etc.

Adobe Illustrator provides a limited snap to handle capability when moving one object with handles near a second object with handles. If the handles come within a small number of pixels of each other, say four pixels, the neighboring handles of these objects snap to each other, with the one in motion moving toward the other object. To separate them requires moving the cursor greater than four pixels to again separate them. While there are objects with can attract cursor driven objects, it is strictly a snap operation. There are no control panels or other mechanisms by which this can be extended or modified. There is a fixed distance at which it occurs. While useful, it is not very flexible and possesses no obvious way to extend such a mechanism to induce motion in any other form.

FIG. 2 portrays a system block diagram of prior related art showing the interface of a microprocessor 20, display 10, a pointing device 12 and other circuitry including but not limited to mass storage device(s) 14 and network interface 16. In such typical prior art systems an IO bus 18 often provides the communication for such devices. Communication 18 includes but is not limited to treating such circuitry as addressable devices on an ISA bus or Universal Serial Bus (USB). In certain examples implementation of communication 18 employs more than one such bus mechanism.

Display devices 10 and pointing devices 12 are not the subject of the invention. Prior art pointing devices 12 for desktop systems with electrically interfaces include but are not limited to mouse pointing devices, pen tablets, touch pads and joy sticks. Smaller computers such as notebook computers and Personal Digital Assistants often incorporate touch pads, pointing buttons, and pen tablet pointing devices. Other prior art pointing devices 12 incorporating a wireless interface include but are not limited to 3-D mice and selector controls for various television, television-like and entertainment systems. The most frequent display devices are CRT displays and flat panel displays, some of which are in color and some of which are in black and white, sometimes further capable of shades of gray and one or more speakers. Personal Digital Assistants often integrate the display and a pen tablet into a veiwable writing surface.

Optionally, mass storage devices 14 commonly include but are not limited to removable and non-removable media devices. Non-removable media include but are not limited to hard disk drives and non-volatile solid state disks. Removable media include but are not limited to floppy disk drives, CD ROM players, PCMCIA flash disk drives and Compact Flash drives.

Optional network interfaces 16 available in typical prior art systems include but are not limited to wireless and wireline communication schemes. Wireless schemes include but are not limited to InfraRed (IR) ports, wireless packet modems used in CDPD, IS-95 and GSM radio communications schemes and W-CDMA. Wireline interfaces include but are not limited to various forms of LAN interfaces, wireline modems and various packet transport schemes including but not limited to ATM. LAN interface protocols include but are not limited to Ethernet, Fast Ethernet, Gigabit Ethernet and Fiber Channel. Wireline modem interfaces protocols include but are not limited to 33.3K, 56K, ADSL and ISDN. Any of the above protocol interfaces may additionally support Wide Area Network (WAN) protocols such as TCPIP and the Internet, with its World Wide Web.

Microprocessors 20 typically require local memory, which includes RAM 24 and usually some form of non-volatile memory 26. Nonvolatile memory includes but is not limited to one or more of the following: ROM, Flash Memory, EPROM and writeable control stores. Such memory, particularly in hand held computers such as PDAs incorporates most if not all of the operating system and applications within the device and may include a file management system using some or all of the non-volatile memory as an emulated disk drive. In certain prior art systems display 10 may be further coupled to RAM 24 by an additional bus to support high speed data transfers between these units.

Evolutionary systems applications such as Windowing systems and multi-dimensional viewers as described above often run under a real-time, event driven operating system including but not limited to MacOS, various versions of Microsoft Windows (3.1, 95, 98, NT, CE) and PalmOS, to name some examples. Several applications have been built in such event driven systems using standard procedural languages such as C and assemblers. Other applications operate in an object-oriented environment. The object systems are often developed in programming language environments including but not limited to C++, Java and Visual Basic.

Other approaches include but are not limited to Lingo by Macromedia, which while not explicitly revealing the event queue, triggers actions based upon semantic constructs such as "on MouseUp" and "on MouseDown". Such approaches implicitly use the standard approach discussed above where the event queue is processed in terms of exactly and only the top element of the event queue. The generated application has added control to exactly those event handlers which are referenced in the source code in the exact context specified by that source code.

FIG. 3 depicts the operation of a representative event queue in such prior art systems. The word queue in this context refers to a First In First Out ordered list. An event queue's list elements are known as events. Each event is further composed of an event type 40, or event handle. An event activity 42, such as button up or down may be further associated with an event in some operating systems. Such event activities may be incorporated into the event type or handle, or may represent a separate field within the event. Each event in an event queue possesses a link to the next most recent event in the queue 44. By way of illustration, an event queue will be shown in two states, 38a and 38b, demonstrating the effect of processing an event in a typical prior art software application.

Event queue 38a contains an oldest event 30, which has a component event type or handle 40 and a link 44 to the next oldest event 32. The next oldest event 32 has a component event type or handle 40 and a link 44 to next oldest event 34 from event 32. This event links to a later event, etc. until a most recent event 36 links to a nil pointer, signifying that it is the most recent event in the queue.

Event queue 38b contains an oldest event 32, which has a component event type or handle 40 and a link 44 to next oldest event 34. This event links to a later event, etc. until a most recent event 36 links to a nil pointer, signifying that it is the most recent event in the queue. The event 30 has been removed from the queue.

FIG. 4 depicts a typical flowchart for an event handler of the prior art. Such event handlers are often implemented as threads in a real-time operating system. A thread usually entails a return stack and register state context of the CPU in a native code execution environment. JAVA and other portable interpretive tools will allocate and save the interpreter control state context for a thread. In both native code and interpretive situations, there is an instruction or program pointer which points to the next (or sometimes an offset of the current) instruction location being executed.

The first procedural activity encountered after setting up the primitive thread environment is the initialization 50 of the event handler thread. Once initialized, the next event in the event queue is retrieved 52. This operation makes it possible for the thread to examine the event and at the same time removes it from the event queue. Referring back to FIG. 3, situation 38a illustrates the condition of an event queue before retrieving the next event and situation 38b illustrates the event queue after retrieving the next event. Process event 54 interrogates the event to determine what needs to be done, usually by considering its event type 40 and event activity 42, and then performs one or more functions using the contents of the event and other information available to the thread. The state of the thread and/or retrieved event is then used to decide whether to quit the application 56. If the decision is to quit the application, then usually there is an operation 58, which cleans up residual memory among other things, and then causes the application thread to exit or terminate. If the decision is to continue the application, then a branch 60 back to retrieve the next event occurs, and a loop is effected. The branch 60 may also entail a time delay or wait function, which often causes the thread to be stored until the next event is found or a given minimal period of time has elapsed.

While there are numerous operating systems which today support real-time and windowing primitives with significant divergence between them, the basic mechanism described here reveals some very uniform semantic constructs: The event handlers consistently retrieve just one event, the oldest in the ordering of the event queue (52). They process one event at a time (54). If the decision to stop the thread is not made, at some possibly later time, they loop back (60) to retrieve the next event and process it. This same mechanism is observed and recommended consistently for applications in all the discussed operating systems (MacOS, various versions of Microsoft Windows (3.1, 95, 98, NT, CE) and PalmOS) and runtime environments mentioned above (C, C++, Java and Visual Basic). Other development approaches like Lingo implicitly utilize this recommended method.

While this mechanism has significantly contributed to the great advances of our time, it poses a significant set of restrictions upon user interfaces. Motion is an effect of change and accumulation, looking at one event cannot tell enough to know or understand a flow and calculate motion. Such mechanisms are often conceptually embodied as a finite digital filter acting upon a collection of near past and/or near future events relating directly to the object in motion, such as a pointing device and its virtual region associate, the pointer. Altering a pointing device location while that data is in an event queue within a windowing system is extremely difficult often leading to applications of questionable reliability. What is needed to achieve such things is a reliable and effective mechanism for altering the contents of an event queue regarding events associated with a pointing device.

Many situations place significant requirements regarding modeling motion upon traversed sub-regions. The portrayal of friction, currents, attraction and repulsion, impulsive and inertial motion effects induced on the pointer is done against the backdrop of the discrete nature of digital computers. Motion effects such as inertia, velocity and acceleration are often best formulated as finite difference schemes. Event queues do not work well in tracking such things. Event queues usually do not report cursor positions at regular time intervals, only when buttons are pushed, etc. Further, event queues do not possess a consistent number of entries for pointer locations at discrete times with predetermined time intervals in the near past and near future of the location being modified, which is a distinct disadvantage in calculating finite difference schemes.

While physics has for centuries provided our basic conceptual paradigm of motion, simulation environments allow for and in fact facilitate a much broader sense of motion than the physical world. Consider the inverse square laws of gravitation and electromagnetism. Such formulations, while well confirmed by experiment, do not lend themselves well to use in human-computer interactions. Further, while the Lorentz force law of electromagnetism and others laws in other branches of physics give us direction dependent induced motion, computationally, these are a small subset of the range of expression a computer can provide to a virtual environment designer.

Inference rules are an established tool in the construction of artificial intelligence systems, in particular, expert systems and constraint based systems. Rules are generically considered to provide a conditional and an action, similar to an if-then construct as found in a procedural language such as C or FORTRAN. There is one fundamental difference between rules in general and the if-then construct of procedural languages, the ordering of rules tends to be irrelevant, whereas in procedural languages and some logic programming languages such as Prolog, the exact sequence of statements is held essential to the meaning of the statements. When the exact sequencing of rules is essential, semantic restrictions forced on applications so developed are often unnatural and sometimes debilitating. Example: when the collection of rules is derived from a database possessing no inherent natural ordering of objects or rules, what is optimal often entails treating all relevant rules on an equal footing. Constraint based systems generally involve a collection of variables which are to satisfy a collection of rules, often known as constraints.

Rule based development systems are available from a number of sources, including implementations of concurrent Prolog and CLIPs, by way of example. Such systems have been used to advantage in generating rules systems including but not limited to several applications targeting specified semiconductor process technologies for VLSI layout verification and generation software, as well as tools interrogating a database for data patterns satisfying specific constraints or inference rules. However, such tools have not been seen as providing an effective, intuitive user interface to specify induced motion based upon traversing one or more geometric objects, or portions of such objects. Such tools also do not provide a mechanism for intercepting the pointing device event stream and controlling the pointer or cursor independently of the default mechanisms provided by the operating system upon which such tools reside.

The last few years have seen the emergence of intelligent agents as a class of software entities with at least limited capability to act independently of a user. These agents traverse the Internet, or possibly one or more Intranets or Extranets, accumulating information which is then presented back to its user at some predetermined time. While these entities are still in their infancy, one substantial issue is the configuring of these agents toward or away from various sites or objects in a virtual space. For instance, a user might want to know about fishing nets, not neural nets.

Many users prefer geometrically oriented interfaces where proximity of two or more entities along a dimension indicates a closeness of context or relevance based upon one or more selected criteria. There is no known user interface supporting the presentation of such agent activity or configuring agents based around a multi-dimensional paradigm with the ability to guide the motion of the agents and/or user in a fashion comparable to the physical paradigms of motion.

SUMMARY OF INVENTION

One aspect of the present invention is implemented as a cursor control system including a display having a plurality of distinct regions, a pointing device influencing a pointer on the display and a mapper. The mapper is responsive to the pointing device and to a position of the pointer relative to the distinct regions, and operative to affect a continued movement of the pointer. The continued movement is a transform of the pointer in at least one of the regions.

This is advantageous in making the perceived cursor motion an avenue of feedback as to the properties of regions the cursor traverses providing a virtual force feedback mechanism. This virtual force feedback provides an inexpensive mechanism for motion altering effects in 2-D virtual environments. This virtual force feedback mechanism is even more useful in 3-D virtual environments, where there are very few direct force feedback alternatives and these alternatives cost a great deal more than similar approaches to 2-D direct force feedback. This virtual force feedback mechanism has no direct force alternative in 4-D and higher dimensional virtual environments.

This method is also advantageous in reducing background mechanical noise by an arrangement of regions and their continued pointer motion transforms. Such advantages can significantly improve the productivity of people. In addition, it can be used to aid those with significant mechanical disabilities as well as people using computers in mechanically noisy environments, such as on bumpy airplanes as well as crowded trains and buses.

Another aspect of the present invention includes a method for controlling a pointer in an object oriented graphical environment including the operations of: developing a list of objects pertaining to graphical regions in a specified area of a display, determining for all of the objects which are pertinent to the pointer location and modifying a movement on the display based upon properties of the pertinent objects.

This method is advantageous in the development of interactive environments where the pointer motion is dependent upon some or all of the pertaining objects in a graphical region. Such lists of objects may be statically determine during application development, developed while the application is running, possibly being stored and retrieved to support an evolutionary object motion library. Such object lists may be stimulated by interaction with software agents.

A further method of the present invention for controlling a pointer in an operating system having an event queue includes: examining the event queue for original pointer events generated by a pointing device; removing the original pointer events from the event queue; and generating new pointer events based upon the original pointer events. Inserting the new pointer events into the event queue.

This is advantageous in permitting an efficient mechanism replacing and/or modifying an existing event handler. This new event handler permits interaction in a transparent fashion within a real-time operating environment employing event queues and windows style pointers based upon the events associated with a pointing device by removing original pointer events and generating new pointer events based upon these original pointer events. Such real-time environments include but are not limited to operating systems (MacOS, various versions of Microsoft Windows (3.1, 95, 98, NT, CE) and PalmOS) and runtime environments mentioned above (C, C++, Java, Visual Basic and Lingo).

It is further advantageous in supporting the examination of the entire event queue for original pointer events, rather than just the top of the event queue. This increases the reliability of the mechanism, given the wide diversity of potentially active applications and the interaction of all their event handlers.

A further method in accordance with the present invention for controlling a pointer in an operating system having an event queue includes; removing from an event queue original pointer events generated by a pointing device; generating new pointer coordinates based upon the original pointer events; and displaying the pointer at the new pointer coordinates.

This is advantageous in permitting an efficient mechanism replacing and/or modifying an existing event handler. This method permits interaction within a real-time operating environment employing event queues and windows style pointers based upon the events associated with a pointing device. Such real-time environments include but are not limited to operating systems (MacOS, various versions of Microsoft Windows (3.1, 95, 98, NT, CE) and PalmOS) and runtime environments mentioned above (C, C++, Java, Visual Basic and Lingo). The generation of new pointer coordinates for a pointer event provides a mechanism where induced motion effects may affect the pointer location at the event handler level just before the pointer is displayed.

A further method of the present invention for controlling a pointer on a display which includes: manipulating a pointing device to move a pointer on a display; observing the pointer motion behavior on the display relative to one or more objects on the display; and modifying the manipulation of the pointing device upon observed behavior to continue the movement of the pointer.

This is advantageous in providing the user/observer a new paradigm of interaction with complex entities, where the observed motion communicates content or attributes of content of objects on the display to the user. Note that the user may be controlling the pointing device. Note that a software or algorithmic agent may be controlling the pointing device, which could be a virtual pointer into a virtual space. Note further that a collection of software or algorithmic agents may be controlling a collection of pointing devices. Thus the modification of the manipulation of the pointing device may entail either modification of the manipulation of a physical pointing device or modification of the virtual manipulation of a virtual pointer in a virtual space.

This method may be advantageously performed by a software tool interrogating an existing program environment and determining which elements should be given induced motion rules and incorporating those induced motion rules into the application's operating system environment.

Software agents may further advantageously use this method to organize the presentation of informational systems interrogations, deriving objects based upon criteria or rules specified by either a higher level, software or algorithmic controlling agent or a user. Such informational systems include but are not limited to database systems, one or more Intranets, one or more Extranets and/or the Internet.

A method of the present invention of interfacing a pointing device and a display device with respect to a virtual region of virtual locations includes; maintaining at least one virtual sub-region with at least one virtual location and at least one induced motion rule; associating the pointing device with a virtual location of the virtual region; forming a list of the sub-regions containing the virtual location of the pointing device; and modifying the virtual location of the pointing device by applying the induced motion rules of the list of the sub-regions containing the virtual location of the pointing device.

This interface method is advantageous by providing one or more sub-regions with induced motion rules, which can alter the virtual location of a pointing device. The collection of sub-regions sharing the pointing device location can then interact as a rule based system to affect the location alteration. This is particularly advantageous in situations where the virtual region is of higher spatial dimension than 2, say 3, 4 or higher dimensions. This is further advantageous when the induced motion rules are not analogues of the standard physical rules of motion, such as when direction of repulsion may be determined by the direction best satisfying some search criteria.

These and other advantages of the present invention will become apparent upon reading the following detailed descriptions and studying the various figures of the drawings.

BRIEF DESCRIPTION OF THE DRAWINGS

FIGS. 9A, 9B and 9C portray various sub-regions in accordance with an embodiment of the invention;

DETAILED DESCRIPTION OF THE PREFERRED EMBODIMENTS

Figure 1:
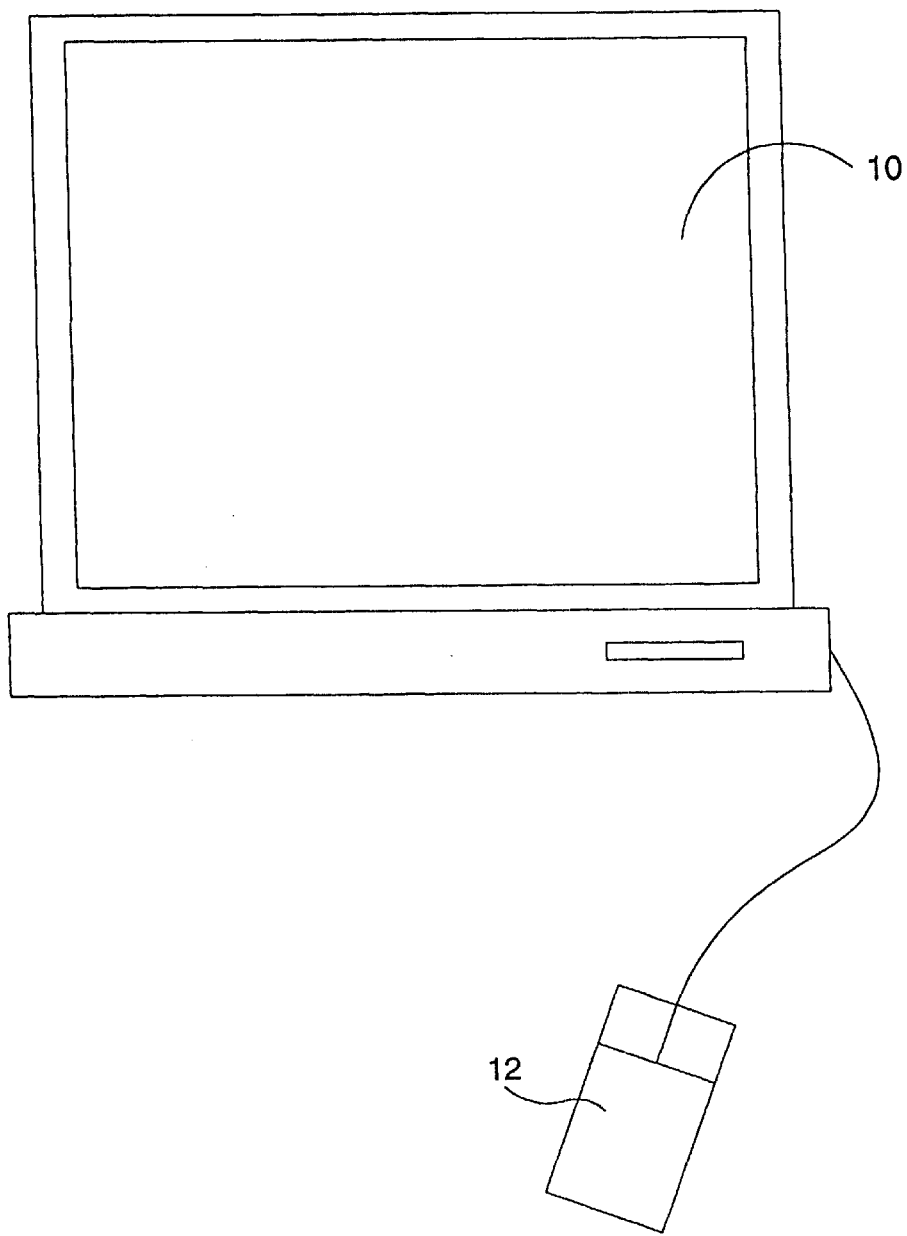
FIG. 1 portrays a prior related art display and pointing device interface.
Figure 2:
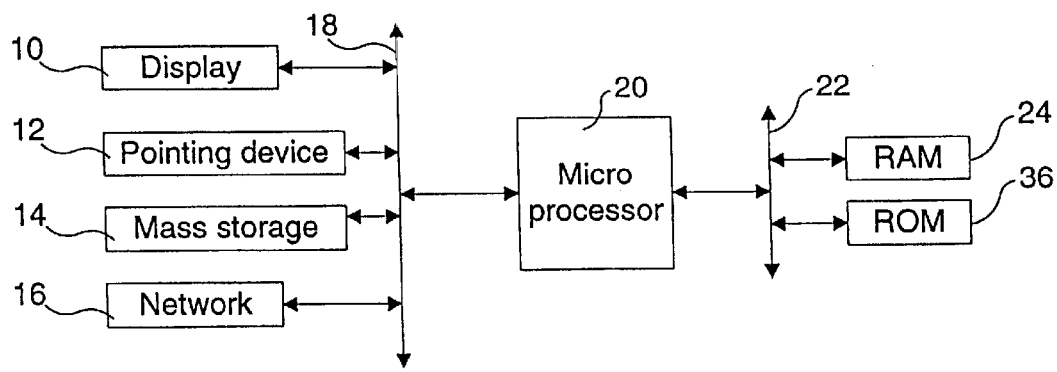
FIG. 2 portrays a system block diagram of prior related art showing the interface of a micro-processor, a pointing device, display and other circuitry.
Figure 3:
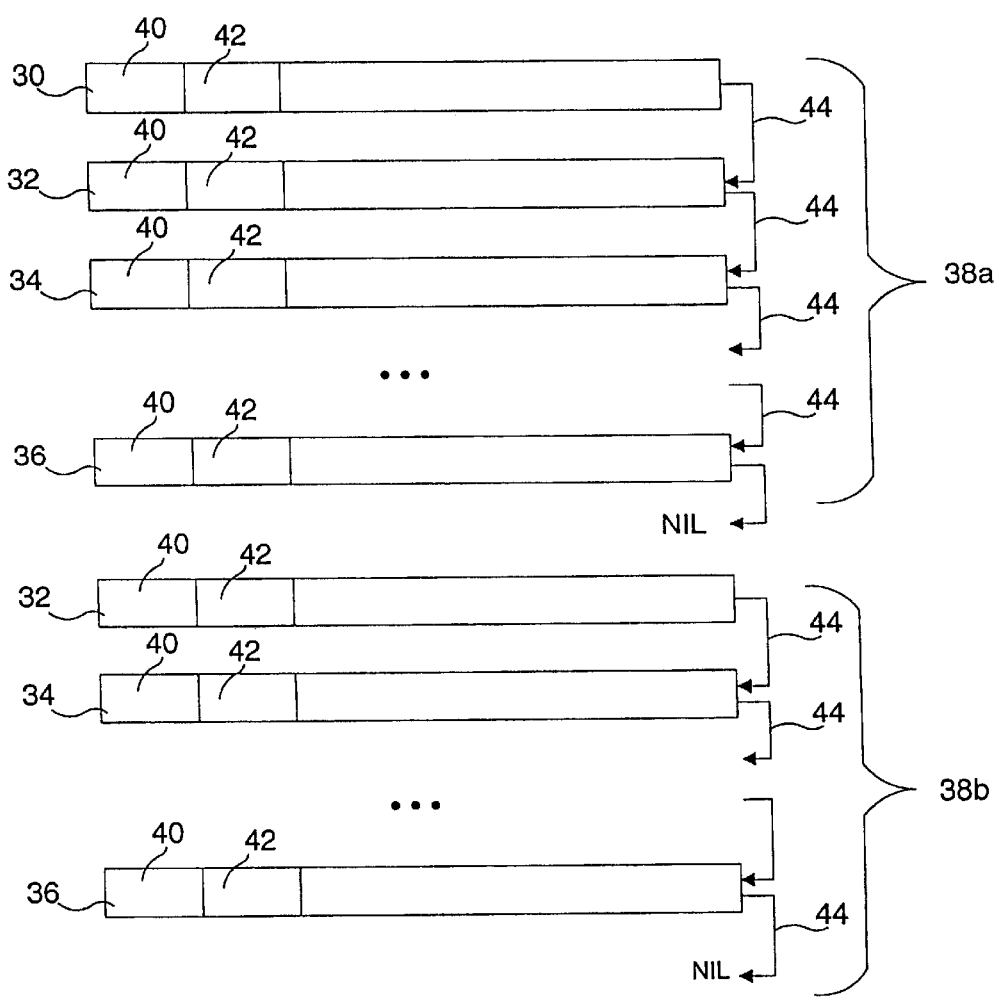
FIG. 3 depicts the operation of a representative event queue in such prior art systems.
Figure 4:
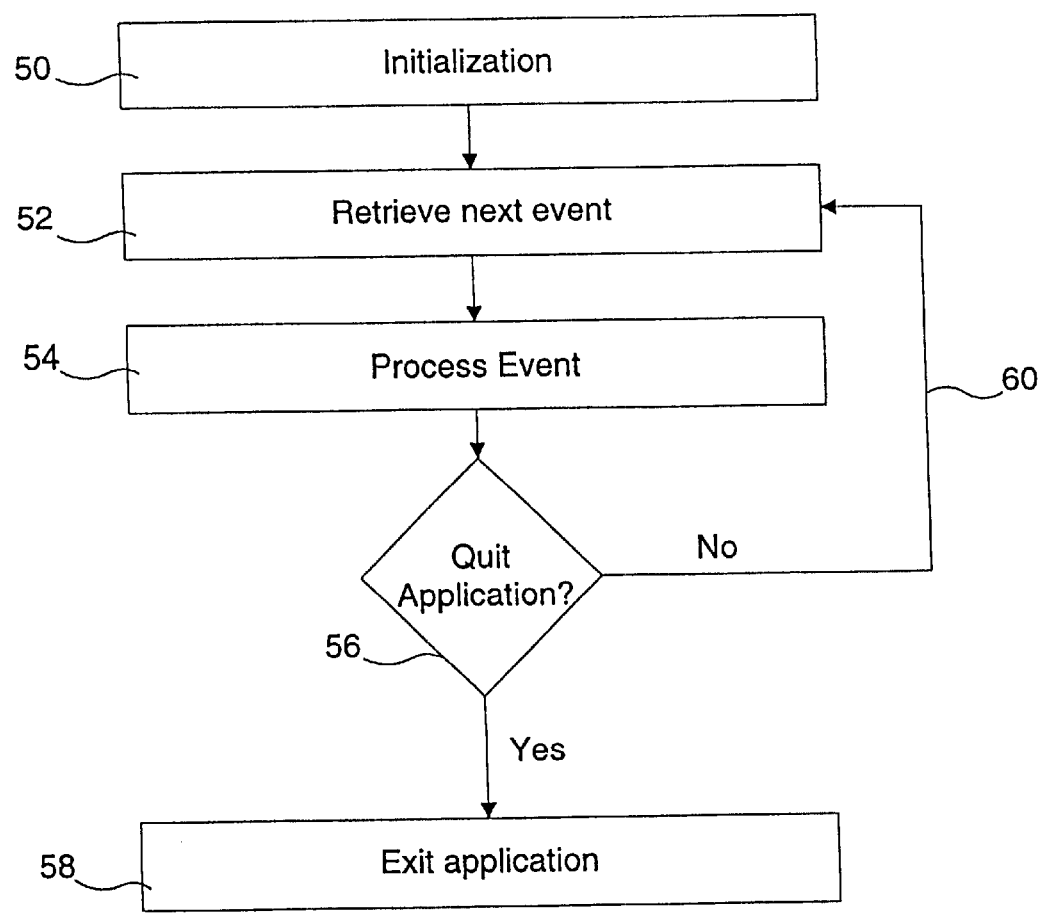
FIG. 4 depicts a typical flowchart for an event handler of the prior art.
Figure 5:
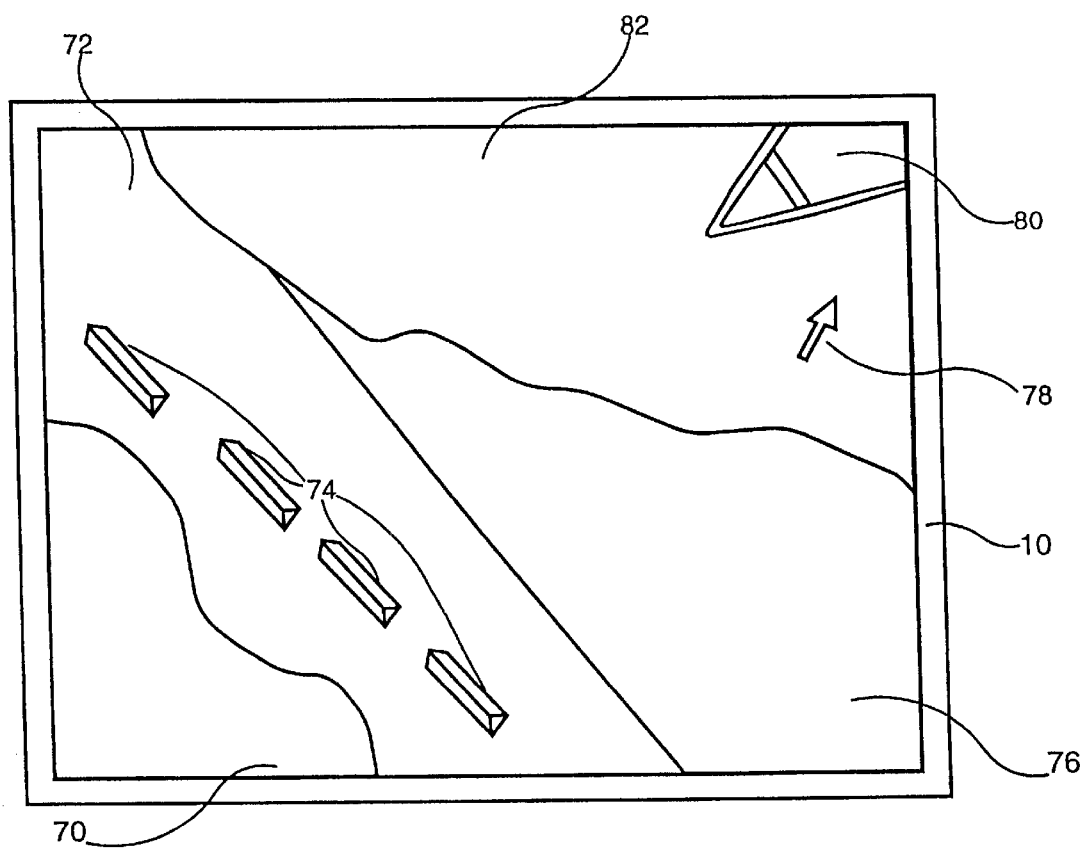
FIG. 5 displays an exemplary view of a collection of graphical objects in accordance with an embodiment of the invention.

FIGS. 1–4 were discussed in terms of the prior art. FIG. 5 displays an exemplary view of a collection of graphical objects in accordance with an embodiment of the invention. Display 10 is composed of region of pixels further comprising several sub-regions, 70, 72, 74, 76, 80 and 82, with pointing device and its associated position in the region represented by the cursor 78's position. By way of example, sub-region 70 represents a slick surface, such as in the human world is encountered over an oil slick. Sub-region 72 represents regular pavement. Sub-regions designated 74 represent automobile tire barriers. Sub-region 76 represents sandy soil, such as a beach. Sub-region 80 represents a boat floating in a sub-region of water 82.

Figure 6:
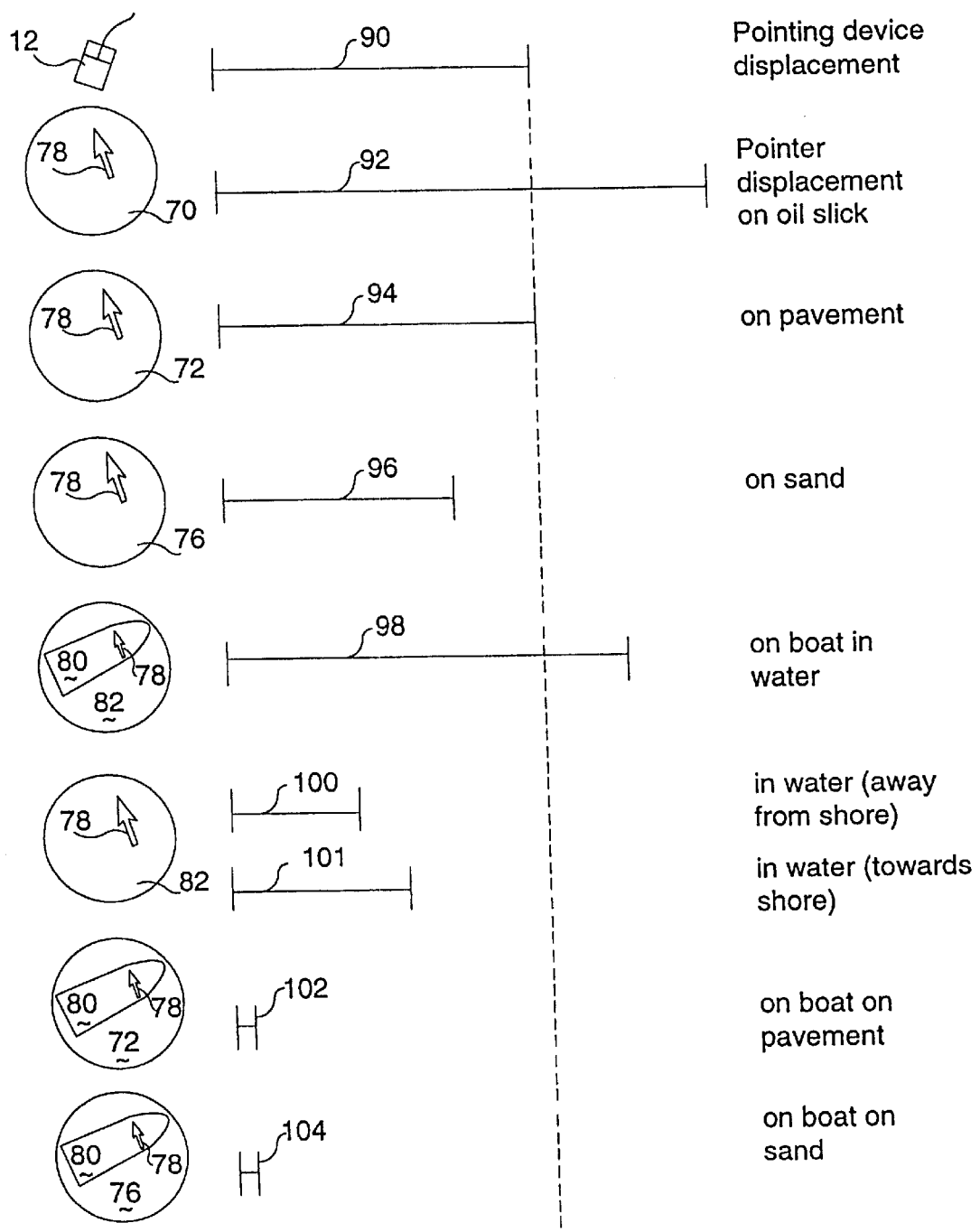
FIG. 6 display an exemplary user view of calibrating a collection of objects to affect motion of a pointer in accordance with an embodiment of the invention.

The invention allows for a common pointing device 12 to demonstrate motion characteristics in each of these sub-regions that differ from their neighboring sub-regions. FIG. 6 displays an exemplary user view of calibrating a collection of objects to affect motion of a pointer in accordance with an embodiment of the invention. This displacement of common pointing device 12 is designated by the bar 90. This is seen at the top of the figure. Beneath this will be seen several further calibrations.

Sub-region 70 models a slick surface. The primary characteristic of such slick surfaces is the lack of friction and the predominance of inertial effects. Once in motion, little can be done to slow one down, or change direction. Once the pointing device indicates motion upon entering such a sub-region, it is very difficult to change that motion within such a sub-region. The cursor 78 in traversing an oil slick 70 will demonstrate a relative displacement 92 with respect to pointing device 12's displacement of 90.

Sub-region 72 models regular pavement, wherein a wheeled object will tend to roll for while, slowing, and eventually stopping. Friction thus acts against inertia. Additional motion on the part of the pointing device will augment the inertial activity of the pointer in such a sub-region. Cursor 78 in traversing a sub-region of pavement 72 would experience a relative displacement 94 comparable to the basic displacement 90 of the pointing device 12.

Sub-region 76 models sandy soil, such as a beach. Friction in such a sub-region would be even higher than on pavement, and there would be even less effect from inertia. Cursor 78 in traversing a sub-region of sand 76 would experience a relative displacement 96 less than the comparable displacement 90 from the pointing device 12's motion.

However, the cursor 78 in the boat 80, would experience less friction in moving the boat 80 upon the water 82. Cursor 78 in traversing a sub-region of a boat 80 on a sub-region of water 82 would experience a relative displacement 98 greater than the comparable displacement 90 from the pointing device 12's motion.

Sub-region 82 models the cursor 78 "swimming" in a sub-region of water 82. The cursor, in representing a person, would experience significant friction when traversing water by itself. Cursor 78 in traversing a sub-region of water 82, would experience a relative displacement 100 much less than the comparable displacement 90 from the pointing device 12's motion. In a further preferred embodiment, swimming "away from shore" as shown by calibration bar 100 has a different frictional value than "swimming toward shore" as shown by calibration bar 101. The directional component of motion, rather than any relationship with an object, such as a point, line, or volume, can determine the induced motion effect.

Running into the pavement 72 in the boat 80 carrying cursor 78 causes both the boat 80 and cursor 78 to stop suddenly as shown by displacement 102. Once the boat 80 and cursor 78 are grounded, motion induced by the pointing device 12 in the direction of the ground would tend to move the cursor 78 off the boat 80 and onto the ground 72. Once the boat 80 and cursor 78 are grounded, motion induced by the pointing device 12 away from the ground would tend to move both boat 80 and cursor 78 away from ground and across the water 82.

Note that the boat 80 carrying the cursor 78 should come to a stop almost instantly upon boat 80 coming aground on the beach 76 as shown by displacement 104. Once the boat 80 and cursor 78 are grounded, motion induced by the pointing device 12 in the direction of the ground would tend to move the cursor 78 off the boat 80 and onto the ground 76. Once the boat 80 and cursor 78 are grounded, motion induced by the pointing device 12 away from the ground would tend to move both boat 80 and cursor 78 away from ground and across the water 82.

Toggling the coupling of boat and cursor by a button being pressed or released may be preferred in certain embodiments of the invention. It may further be preferred that the button be associated with the pointing device. By way of illustration, the boat and cursor may be coupled when a mouse button is pressed and not be coupled when a mouse button is released.

The effects discussed so far regarding this figure have all been addressable by a model based upon a friction/traction paradigm, for which a slider bar calibration makes intuitive sense as a user control interface embodiment.

Note that the water may further possess a current, partially inducing motion in a further direction irrespective of the action of the pointing device 12, which is not shown in this calibration figure. A slider bar with a directional dial is one preferred embodiment for user control of an induced velocity current.

Sub-region 74 models automobile tire barriers. Such sub-regions exhibit a repelling effect upon the pointer in the sub-region in the direction opposite the mid-line of each sub-region in one preferred embodiment of the invention. Other sub-regions should be able to attract just as these sub-regions repel. Hence a slider bar over a percentage range of –N % to +N % calibrates the motion toward or away from the region, simulating an urging which attracts or repels with respect to some location in proportion to the incremental velocity. In certain preferred embodiments N is chosen so that $0<N<=100$. Note further that it is natural to model such barriers as boxes, not necessarily aligned with a particular coordinate axis system. Note further that motion components may have a directional nature in some preferred embodiments. This will be discussed in greater detail shortly.

Incremental velocity is essentially a finite difference approach to calculating the instantaneous velocity. It requires a queue possessing at least 2 incrementally timed samples of location to estimate the instantaneous velocity, with additional timed samples providing an increase in accuracy on the whole.

Figure 7:
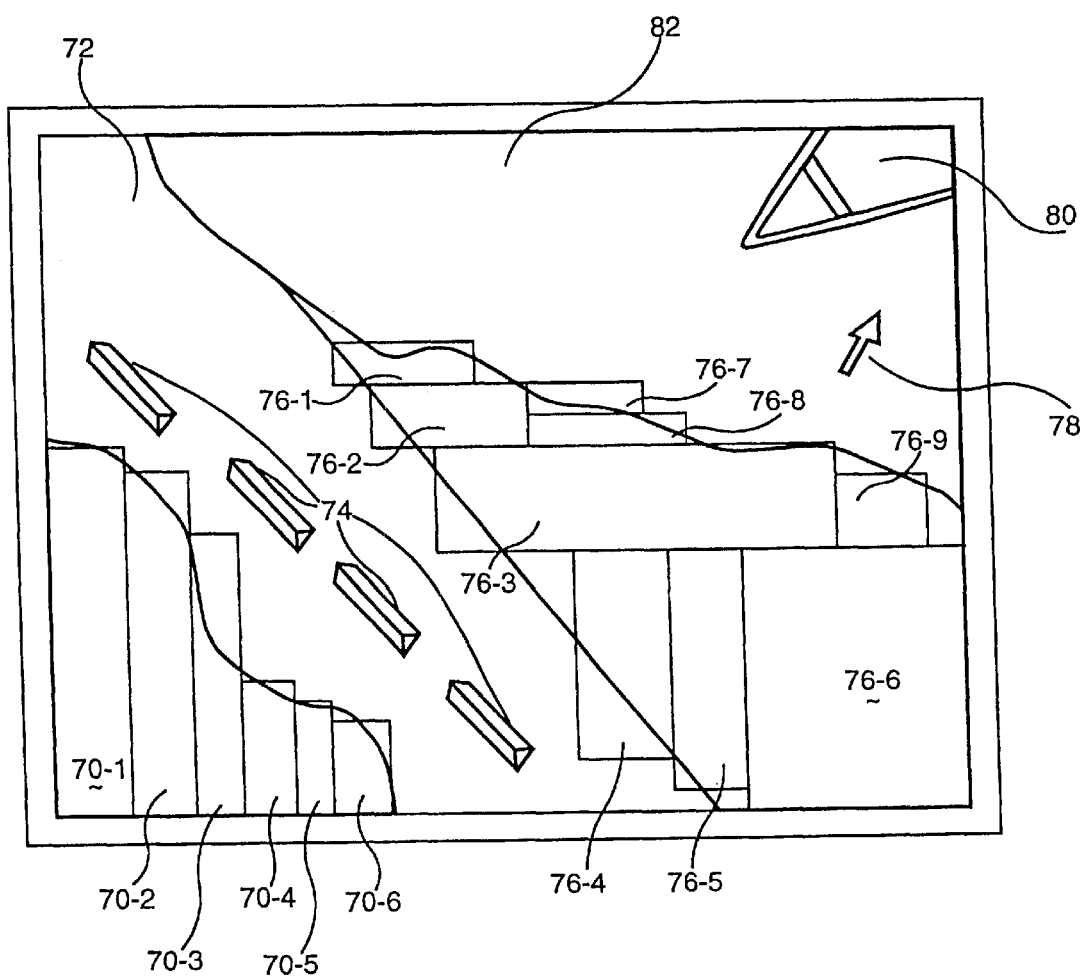
FIG. 7 displays an exemplary decomposition of some of the graphical objects in FIG. 5 in accordance with an embodiment of the invention.

FIG. 7 displays an exemplary decomposition of some of the graphical objects in FIG. 5 in accordance with an embodiment of the invention. By way of illustration, sub-regions 70 and 76 are shown covered with collection of boxes. Sub-region 70 is covered by box 70-1 to 70-6. Sub-region 76 is covered by box 76-1 to 76-9. Note that motion effects can now be attributed to each box, and can vary across a collection of boxes, the sand getting deeper, the oil slicker, etc. The determination of which motion effects to induce can be readily performed by comparing the pointer location in the virtual region for inclusion within the box. Such calculations are quite computationally efficient.

Recall the automobile tire barriers 74. These are also readily modeled as boxes. However, these boxes are not necessarily aligned to the coordinate axis system being employed. Thus, in certain preferred embodiments, boxes not aligned to the coordinate axis system are advantageous.

Modeling of motion can be further preferred to include not only a frictional component affecting the strength of motion dependent upon one or more sub-regions, but also motion dependent upon directional components. Other alternative embodiments include but are not limited to modeling effects changing over time. Yet other alternative embodiments include but are not limited to effects changing over distance.

Directional components of motion can preferably be further defined in terms a parallel and perpendicular components with respect to a point, line, plane or hyperplane which may be further preferably associated with a sub-region or a bounding box associated with a sub-region. Note that a line can be expressed as a linear equation of two coordinates in a two-dimensional coordinate system, the intersection of two planes in a three dimensional coordinate system, or the intersection of three hyperplanes in a four dimensional coordinate system. Similarly, a plane can be expressed as a linear equation in three coordinates in a three dimensional system, the intersection of two hyperplanes in a four dimensional coordinate system, etc. Again in a similar manner, a four dimensional hyperplane can be expressed as a linear equation in four coordinates in a four dimensional coordinate system, the intersection of two five-dimensional hyperplanes in a five dimensional coordinate system, etc.

Changes in strength of a motion effect can be further preferably embodied as changing with regards to these coordinates relative to specific points, lines, planes or hyperplanes. A motion effect changing with regards to a point, with one or more parallel and/or perpendicular components, is similar to an effect emanating from a point charge. A motion effect changing with regards to a line, with one or more parallel and/or perpendicular components, is similar to an effect emanating from the line. A motion effect changing with regards to a plane, with one or more parallel and/or perpendicular components, is similar to an effect emanating from a surface at some distance relative the normal of that surface. A motion effect changing with regards to a four dimensional hyperplane, with one or more parallel and/or perpendicular components, is similar to an effect emanating from a three dimensional volume progressing through the fourth dimension and propagating through the three volume dimensions and fourth dimension. The fourth dimension often designates a progression of time or information state. Such analogies with regards to physical models are presented by way of illustration and are not meant to limit embodiments to motion as found strictly within existing physical models.

Note further that while rectilinear box have been used to partition the sub-region, other shapes, in particular triangulations of the geometry of the sub-region are readily capable of performing in the same manner. Traingulation of a 2-D geometry would yield a collection of triangles, also known as a 2-D simplicial complex. A single triangle is also referred to as a 2-D simplex. Triangulation of a 3-D geometry would yield a collection of tetrahedrons, also known as a 3-D simplicial complex, with a tetrahedron also known as a 3-D simplex. Triangulation of a 4-D geometry would yield a 4-D simplicial complex. 4-D triangular shapes do not have a commonly accepted name. It should be apparent that this naming system and the associated partitioning could be carried on for geometries of any finite number of dimensions.

Similarly, boxes can also be used to partition geometrical objects of any finite number of dimensions. Further preferred embodiments incorporating ovals to partition a sub-region is advantageous in certain circumstances. Further, a sub-region may be partitioned into a collection incorporating more than one kind of shape, such as rectangles and ovals, or rectangles and triangles, or rectangles, triangles, and ovals.

For the purpose of clarity and simplicity of discourse, a box, a simplex or oval, hereafter will be referred to as a bounding box. A bounding box may be preferably aligned or unaligned to coordinate axes. A bounding box in certain further preferred embodiments may include other shapes which can be readily defined in terms of at least one parametrized inequality, which if satisfied, indicate the location belongs to the geometry to which the parameters used in the inequality are associated.

A parametrized inequality will be minimally considered as including but not limited to a collection of arithmetic operations on a collection of at least one location coordinate value which is then compared to a specific value herein. Arithmetic operations include but are not limited to addition, subtraction, multiplication, division as well as specialized functions of one or more parameters. Such specialized functions include bit level functions such as bit count, bit flip, as well as standard bit level operations such as shifting, AND, OR, XOR, etc. Such specialized functions further include but are not limited to exponential, logarithm, and other functions often found in transcendental function libraries. The locations involved may be associated with the pointer, pointer device history, pointer history, pointer, or objects, sub-regions or regions proximate to the pointer either currently or in the recent computational past or future. Pointer device histories and pointer histories will be discussed in greater detail later.

A sub-region in certain preferred embodiments may be partitioned into one or more bitmaps. A bitmap is defined as a collection of locations with the region. A sub-region may be further preferably partitioned as a collection of both bounding boxes and bitmaps. A covering will consist of the collection of locations within the region which are contained in at least one of the partition components, which may be either a bounding box or a bitmap.

Partitioning a sub-region includes but is not limited both non-overlapping and overlapping coverings. Overlapping coverings include but are not limited to nested coverings, wherein on bounding box is completely in the interior of another bounding box.

Note that while this example (FIGS. 5 and 7) models a 3-D environment, it is an essentially 2-D simulation. This model was intentionally chosen for its simplicity. Similar discussions involving higher dimensional simulation environments are readily attainable using the invention. This and subsequent examples that follow are not meant to imply a limitation to 2-D, but are rather illustrative of basic principles of motion: inertial and momentum-related, attraction-repulsion and friction-traction effects. Such effects are not limited to just two, three or even four dimensions in simulating or presenting systems.

Computers are literally named for their ability to compute numbers. However, they can be used to generate much more subtle things than just a computation of arithmetic operations upon a set of numbers. A rule based approach to modeling motion, which provides the ability to apply a collection of relevant rules to infer and compute an induced motion is one preferred embodiment of the invention. Induced motion rules are associated with sub-regions, so that if a pointer traverses a sub-region, its associated induced motion rules are relevant to inferring the induced motion.

A further preferred embodiment associates at least some of the induced motion rules to at least one of the bounding boxes of a sub-region. This is advantageous where there are nested sub-regions, such as when the cursor 78 of FIG. 5 is on a boat 80 traversing a water sub-region 82. A current flowing in the water might have varying strength and direction depending upon where in the water, or equivalently, in which bounding box associated with the water sub-region the cursor 78 and boat 80 are traversing.

Figure 8:
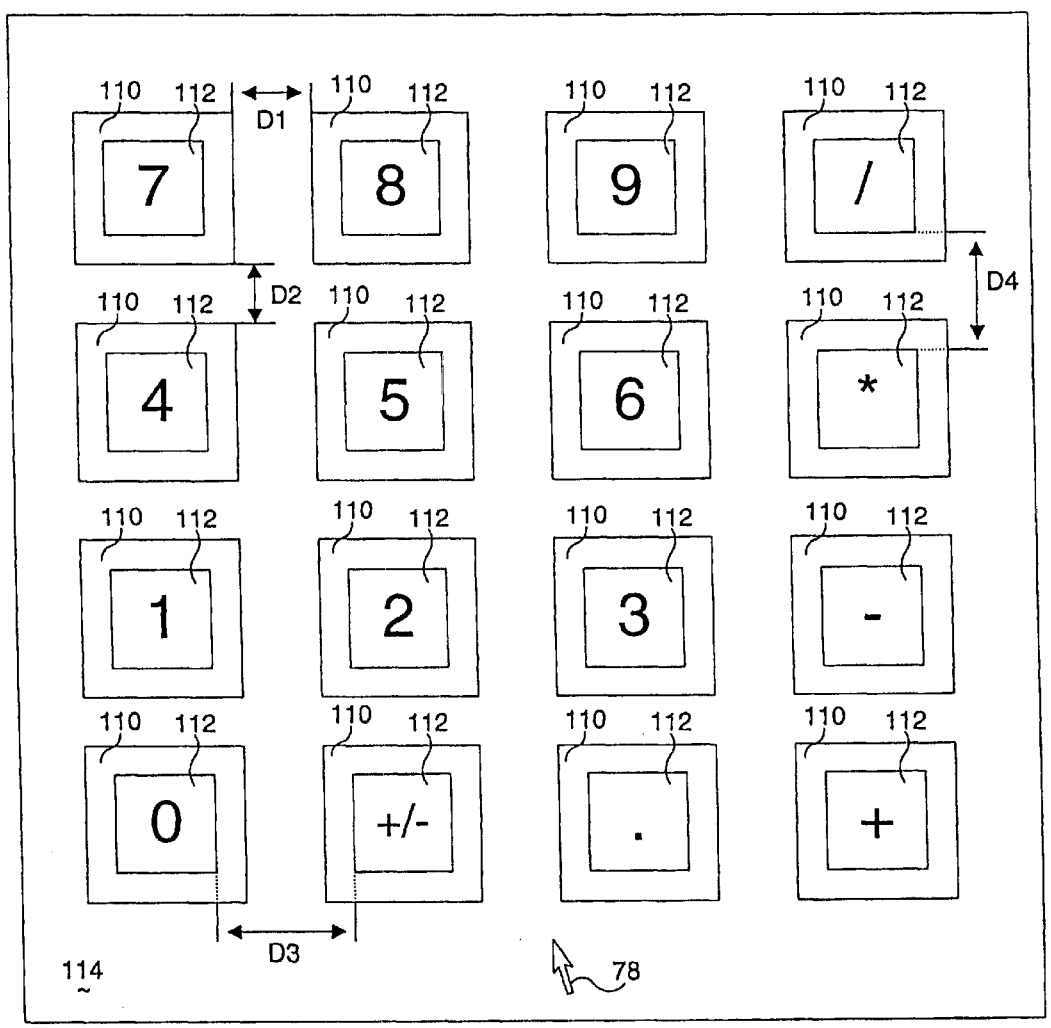
FIG. 8 displays an exemplary view of a graphical object composed of a collection of buttons in accordance with an embodiment of the invention.

FIG. 8 displays an exemplary view of a graphical object composed of a collection of buttons in accordance with an embodiment of the invention. It emulates a calculator keyboard. There are sixteen buttons situated in an area 14. There is an inner area 110 and a surrounding outer area 112 associated with each button. The buttons represent the 10 decimal digits, as well as keys to insert a sign, decimal point and perform operations of add, subtract, multiply and divide.

Various applications may or may not substantially separate adjacent rows and columns of buttons. Buttons often possess two bounding boxes sharing a common center in a fashion similar to the relationship between areas 110 and 112. Note that this similarity is not meant to limit the scope of either 110 or 112 to existing artifacts of a button in a particular windowing system. The size of any additional separation between adjacent columns of buttons will be denoted by D1. The size of any additional separation between adjacent rows of buttons will be denoted by D2. The separation between adjacent columns of inner areas 110 will be denoted by D3. The separation between adjacent rows of inner areas 110 will be denoted by D4.

In one preferred embodiment, each button is associated with two sub-regions. Sub-region 110 surrounds sub-region 112. Sub-region 114 incorporates these 16 nested pairs of sub-regions.

Consider first an isolated button. To reduce background mechanical noise, it is preferable to attract the cursor to the button. This could be accomplished by attracting the cursor toward the center point of the center of sub-region 110 particularly when it is in sub-region 112, particularly as the cursor enters sub-region 112 from outside sub-regions 110 and 112. Once in the button, it is preferable for the cursor to be able to leave the button. Inducing neither attractive nor repelling motion effect on the cursor when in sub-region 110 is a further preferred embodiment. Turning off the attractive motion effect upon the cursor as it leaves sub-region 110 and traverses sub-region 112 is further preferred.

In another preferred embodiment, each button is associated with one sub-region, possessing two bounding boxes 110 and 112. The sub-region 114 incorporates these 16 sub-regions and possibly locations not associated with these 16 sub-regions. Each bounding box 110 completely contains bounding box 112. Bounding boxes 110 and 112 share the same center. An induced motion rule associated with sub-region 114 test whether the cursor is not in any of the 16 button sub-regions, and if it is not, resets a first flag. Some induced motion rules associated with bounding box 110 each include testing a first flag to determine if it is reset. This flag is set by an induced motion rule associated with bounding box 112, which always executes. One or more additional rules associated with bounding box 110 test whether the flag has been set, and if it has, induce motion away from the center of the two bounding boxes.

Assume for the time that D1 and/or D2 are substantially greater than 0, so that there is a substantial separation between adjacent columns and/or there is a substantial separation between adjacent rows in the button array. Consider next an array of sub-region pairs such as the example of FIG. 8. The interaction between the pointing device, cursor and the sub-regions will be discussed in terms of the interaction of a central button and neighboring buttons to simplify the discussion.

FIG. 9A portrays various sub-regions in accordance with an embodiment of the invention as the buttons 5 and its neighboring buttons 2 and 4. This figure displays cursor motion between adjacent buttons sharing either the same row or the same column.

In one preferred embodiment of the invention, each sub-region is depicted as an inner box surrounded by an oval with both box and oval sharing a center. Button 2 has an inner box 116 and a surrounding oval 114. Button 4 has an inner box 120 and a surrounding oval 118. Button 5 has an inner box 124 and a surrounding oval 122. Button 5 also has a box 126 associated with it, also sharing a center with box 124 and oval 122. An example horizontal motion between adjacent buttons in the same row, such as from button 4 to button 5 is designated by arrow 128. An example vertical cursor motion between adjacent buttons in the same column, such as from button 2 to button 5 is indicated by arrow 130.

Box 126 in certain preferred embodiments is further incorporated with sub-region of button 5. It has an associated attractive force centered at the shared center of bounding boxes 122 and 124 which decays as the distance from that shared center increases. When the magnetic force associated with button 5 is turned off or masked, this then affects induced motion with box 126 as well.

FIG. 9B portrays various sub-regions in accordance with an embodiment of the invention as the button 5 and its neighboring buttons 1, 2 and 4. This figure displays cursor motion between neighboring buttons sharing neither the same row nor the same column. Button 1 is associated with inner box 128 and outer box 130. Button 2 is associated with inner box 116 and outer box 134. Button 4 is associated with inner box 120 and outer box. 132. Button 5 is associated with inner box 124 and oval 122. Note that the ovals shown for button 2 and 4 are not shown for reasons of clarity. Note also that button 5 is associated outer box 126 is also not shown for reasons of clarity.

Certain preferred embodiments associate a larger area of attraction to each button in a fashion similar to box 126 and button 5. For the sake of discussion, assume that box 130 is associated with button 1, box 132 with button 4 and box 134 is associated with button 2 in a fashion equivalent to the above discussion regarding box 126 and button 5. In turning off the magnetism of button 5, cursor traversal of area 136 will tend toward one of the neighboring buttons, 1, 2 or 4. Further preferred embodiments where the indication of leaving the sub-region associated with the 5 button may further urge the pointer toward the nearest button to the direction it is traveling upon leaving that sub-region associated with 5. Note that the direction may be further preferred to be an average direction over a predetermined time period.

FIG. 9C portrays various sub-regions in accordance with an embodiment of the invention. The graphical object displayed is a thumb or selector wheel as often found in instrumentation applications. Such wheels require the pointing device to make a circular motion, something particularly difficult to do with a mouse. This situation tends to aggravate whatever mechanical background noise may be present. In this exemplary embodiment, there are two circular ovals 142 and 144 sharing a common center 140. Oval 142 is completely contained in oval 144. The radius of oval 142 is designated by R1, is substantially smaller than the radius of oval 144, which is designated by R2.

In operation, the inner oval 142 has a repelling force from center 140 associated with it and outer oval 144 has an attracting force toward center 140 associated with it. These forces will act to repel the cursor back into circular motion when it strays into the inner oval and act to attract the cursor back into circular motion when it strays outward from a circular motion.

In a number of circumstances, fine motion of turning the dial is preferred. This can be achieved using the friction setting in the direction perpendicular to the radial direction from the cursor to the center. This frictional setting may be altered to permit the pointing device to travel further relative to the traversed circular motion of the cursor.

Figure 10:
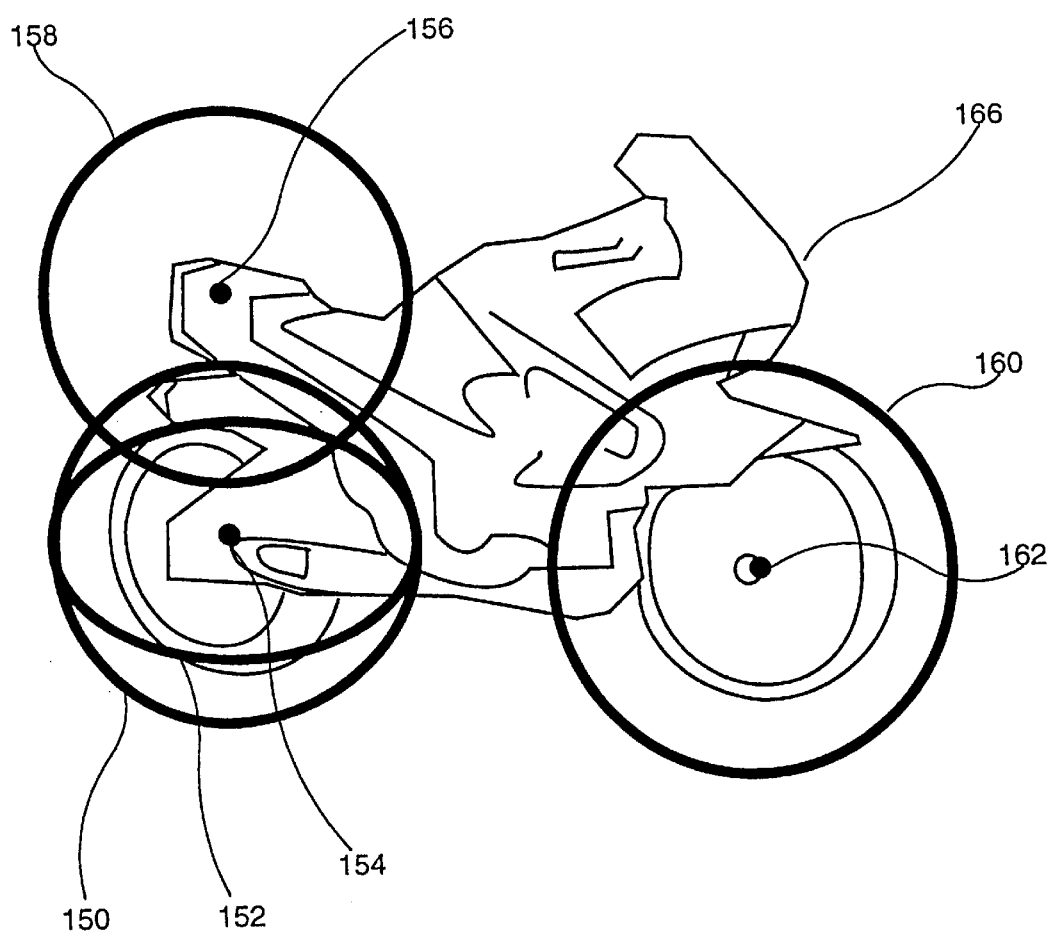
FIG. 10 portrays a collection of sub-regions in accordance with an embodiment of the invention.

FIG. 10 portrays a collection of sub-regions in accordance with an embodiment of the invention. FIG. 10 depicts a graphical object 166 portraying a motorcycle and employing three sub-regions of attraction. Each sub-region is associated with bounding box ovals. The first sub-region centers on the axle of the back wheel 154 with two bounding box ovals, a circular bounding box oval 150 and a non-circular bounding box oval 152. The second sub-region centers on back seat 156 with one circular bounding box oval 158. The third sub-region centers on the front wheel axle 162 with one circular bounding box oval 160. Note that this example shows no repelling magnetic forces or objects. In certain preferred embodiments, a pointer or cursor will tend to be attracted to a magnetic center as it moves toward such a center. In certain further preferred embodiments, a pointer or cursor will tend to be more weakly attracted as it moves away from such centers.

Figure 10A:
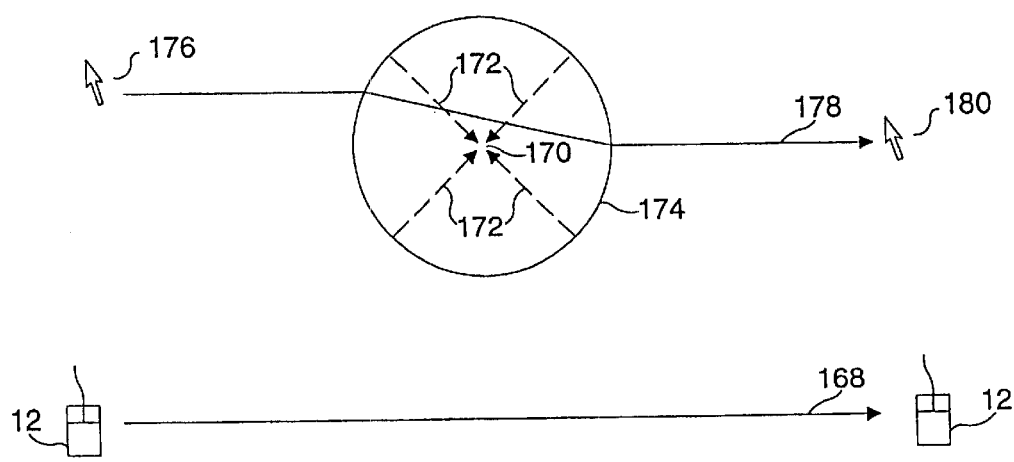
FIG. 10A portrays the users motion of the pointing device and the display generated effect of virtual force feedback in accordance with an embodiment of the invention.

FIG. 10A portrays the users motion of the pointing device and the display generated effect of virtual force feedback in accordance with an embodiment of the invention. FIG. 10A shows the motion of the pointing device 12 to be essentially linear 168. The pointing device motion produces cursor motion portrayed. The cursor passes near a center of attraction 170. The cursor starts at location 176, moves linearly until entering the circular bounding box oval 174. Once within this bounding box, an attractive force 172 directed toward center 170 is induced upon the cursor motion changing the linear path of the cursor across this sub-region until the cursor leaves the sub-region to follow an again follow a linear path 178 with final location 180.

Figure 10B:
FIG. 10B portrays an exemplary control box for calibrating such motion.

FIG. 10B portrays an exemplary control panel for calibrating such motion. Box 182 shows the calibration of the Force In toward a bounding box oval center in radial distance from the center over time progressing from earlier time on the left to later in time on the right. Section 184 of the Force In calibration portrays the lack of attractive force as the cursor moves toward the center, but is still outside the oval of attraction. Section 186 of the Force In calibration displays the attractiveness as the cursor is within the oval of attraction. Section 188 of the Force In calibration displays a lack of attraction as the cursor continues movement after entering the oval of attraction.

Box 196 shows the calibration of the Force Out of a bounding box oval in radial distance from the center, which is the magnetic object of the example. Section 190 of the Force Out calibration shows the lack of attraction of the cursor outside the oval of attraction. Section 190 of the Force Out calibration corresponds to section 184 of the Force In calibration. Section 192 of the Force Out calibration shows an attraction while the cursor is within the oval of attraction, but moving away from the center of the magnetic object. Section 192 of the Force Out calibration corresponds to section 186 of the Force In calibration. Note that Section 192 represents a weaker attraction than section 186. Section 194 of the Force Out calibration displays a lack of attraction as the cursor continues movement after entering the oval of attraction. Section 194 of the Force Out calibration corresponds to section 188 of the Force In calibration.

Figure 11:
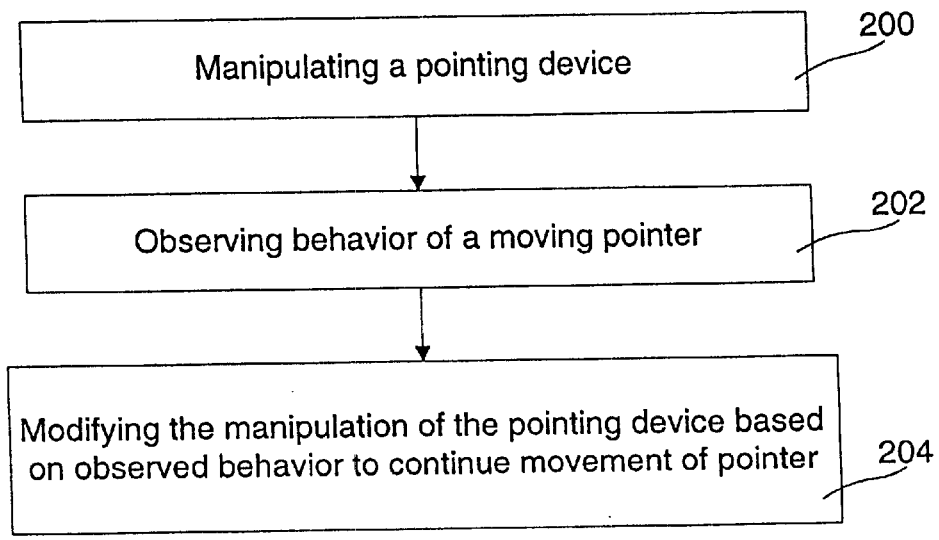
FIG. 11 depicts a high level flowchart of using an embodiment of the invention.

FIG. 11 depicts a high level flowchart of using an embodiment of the invention. Operation 200 depicts manipulating a pointing device. The behavior of the moving pointer is observed in operation 202. Based upon the observed behavior of the pointer, the manipulation of the pointing device is modified in step 204.

Note that in traditional user interface situations, the operations presented above would be performed by a single user. A system consisting of several users interacting in a group context might find several users sharing a single display in a preferred embodiment. Such a display might well be comprised of a multiplicity of regions.

More recent applications of displays to map extremely large databases or search spaces as higher dimensional topic spaces, might also include agents using, observing and modifying the use of pointers within that display space. Agents might either be users or intelligent agents moving pointers within the display space or a virtual space based upon induced motion rules interacting with the objectives of the specific agent instantiations.

Figure 12:
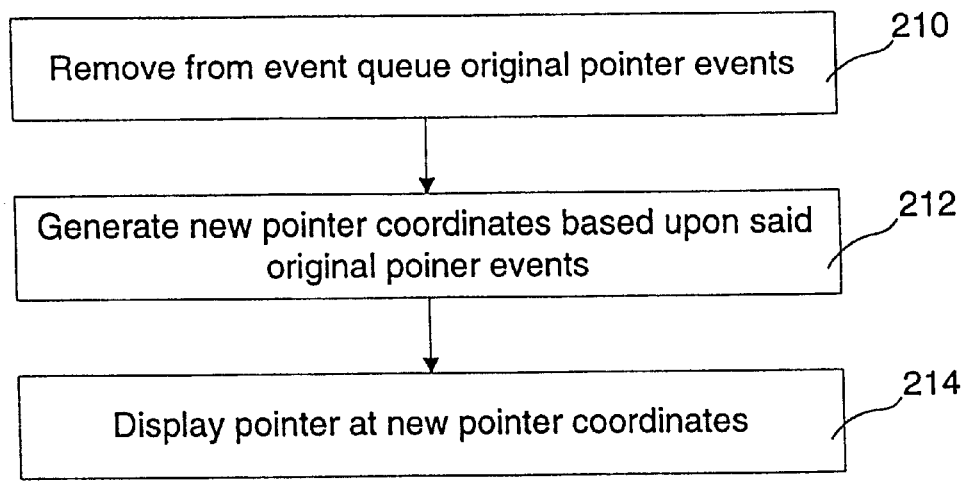
FIG. 12 depicts a high level flowchart of accessing pointer event on an event queue and displaying the pointer at new coordinates in accordance with an embodiment of the invention.

FIG. 12 depicts a high level flowchart of accessing pointer event on an event queue and displaying the pointer at new coordinates in accordance with an embodiment of the invention.

Operation 210 removes original pointer events from an event queue. Examining the entirety of the event queue and removing all original pointer events in one operation is one preferred mechanism. It is further preferred that any other thread be unable to insert new original pointer events into the event queue while this operation was active. Alternatively, operation 210 accesses the top of the event queue. Such an alternative operation 210 would further preferably access to the of the event queue before any other event processing operation can be performed by the operating system or executing applications and their respective threads regarding pointer events.

Operation 212 generates new pointer coordinates based upon the original pointer events. Such an operation preferably incorporates estimates of one or more of the list including velocity, acceleration and inertia. These calculations may occur in either or both the physical domain of motion and in one or more virtual domains of motion. The virtual domains of motion may relate to a window object space, or to a global screen display space, or a virtual domain such as a search or database possessing a location mechanism incorporating a coordinate system of at least two dimensions.

Operation 214 displays the pointer at the new pointer coordinates. The domain calculations starting from the physical domain yield a pointer coordinates mapping to the screen display space.

Figure 12A:
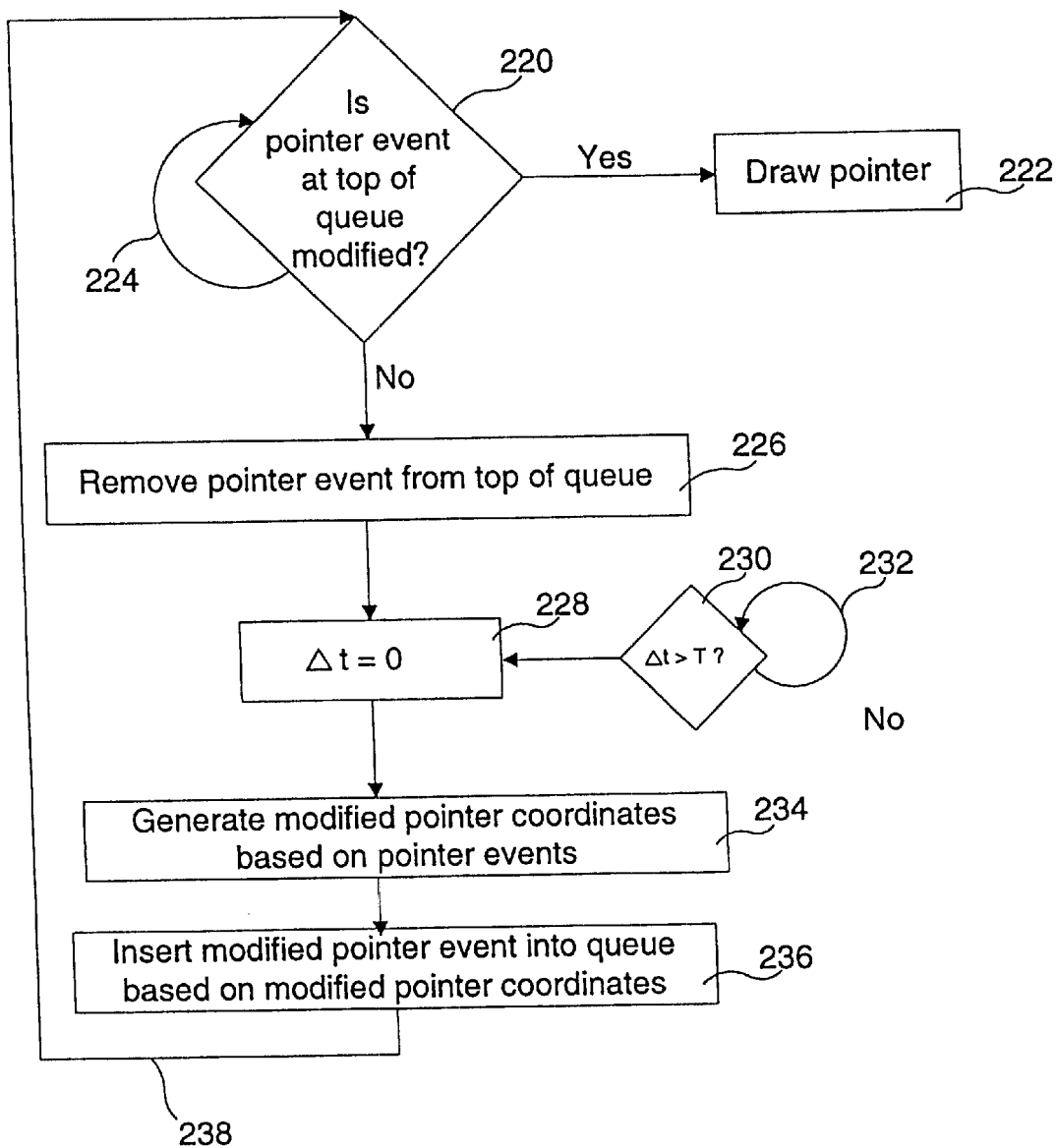
FIG. 12A depicts a high level flowchart of accessing a pointer event on an event queue and also generating modified pointer coordinates based upon elapsed time delay triggers of predetermined duration.

FIG. 12A depicts a high level flowchart of accessing a pointer event on an event queue and also generating modified pointer coordinates based upon elapsed time delay triggers of predetermined duration.

Operation 220 tests the top of the queue to determine if it is a modified pointer event. If it is a modified pointer event, then operation 222 draws the pointer at the location specified by the event and removes it from the event queue. Wraparound arrow 224 designates the recurrent nature of the thread performing these operations in some preferred embodiments delayed by a predetermined time increment, which occurs whenever the top of the event queue is not a pointer event.

If the top event in the event queue is not a modified pointer event, but is a pointer event, then execution proceeds to operation 226, where the pointer event is removed from the top of the event queue. Operation 228 then forces the time increment Δt to 0. This time increment is concurrently incremented by the background operating system on a regular, often clock driven, basis. Note that an alternative preferred embodiment, rather than resetting the time increment, may capture the current time stamp. In such alternative embodiments, time increments are calculated in real time as the difference between the captured and current time stamp. Since these mechanisms are essentially equivalent, the time increment notation will be used exclusively, so as to simplify the discussion.

Note that operation 230 tests to see if the time increment Δt>T, where T is a predetermined time constant. This operation is repeated in a concurrent fashion as indicated by wraparound arrow 232, perhaps at a slightly later time, when the time increment may have been modified as discussed above. If the time increment Δt is greater than the predetermined time constant T, then the sequence of operations starting at 228 and proceeding downward is executed.

Operation 234 generates modified pointer coordinates based on pointer events.

Operation 236 inserts modified a modified pointer event into the queue based upon the modified pointer coordinates generated in operation 234. When the sequence of operations 228, 234 and 236 is completed, execution may preferably proceed to loop based upon arrow 238 back to operation 220. Alternatively, the completion of this sequence of operations initiated by operation 230 may lead to terminating the execution sequence. This alternative in effect treats operations 228, 234 and 236 as a subprogram.

Figure 13:
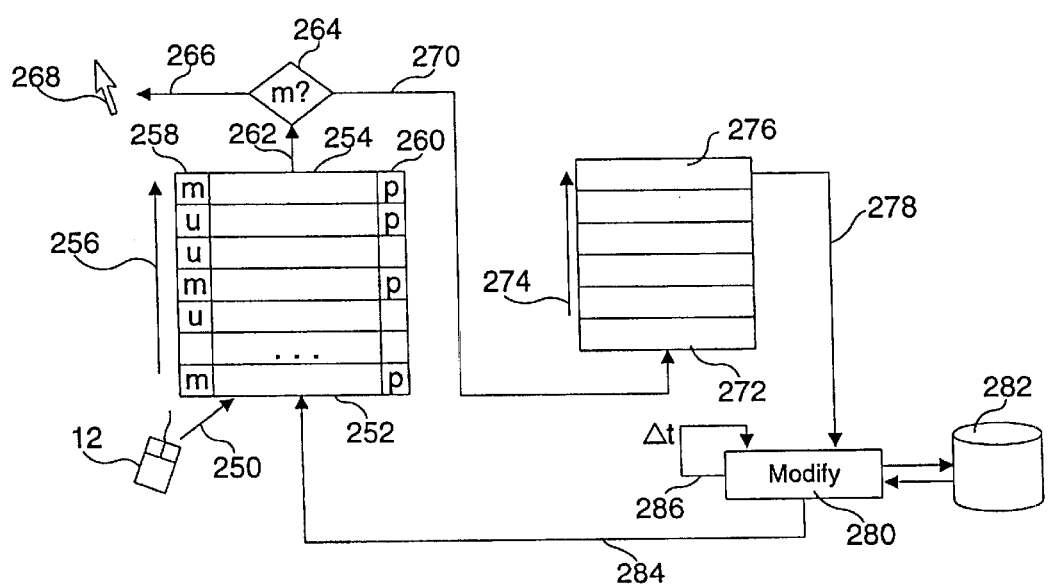
FIG. 13 illustrates a process of execution of flowcharts of FIGS. 12 and 12A.

FIG. 13 illustrates a process of execution of flowcharts of FIGS. 12 and 12A. The new pointer coordinates may be preferably tagged and re-inserted into the event queue as modified, rather than as original or unmodified pointer events, so that other event handlers can make use of them.

Starting from the physical domain of motion, pointing device 12 is sensed and a pointer event in inserted into the end of an event 252 as indicated by arrow 250. The queue moves from newest event entered on the bottom to oldest event 254 at the top of the queue as indicated by arrow 256. The arrow 250 is preferably embodied as a low level pointing device handler. Such device handlers are part of the operating system of windowing systems including but not limited to MacOS, various forms of Windows (3.1x, 95, 98, NT and CE) and PalmOS. Such pointing device handlers are further assumed in the runtime environment supporting graphical user interfaces in a variety of language settings including C, C++, Java and Visual Basic. Lingo does not explicitly reveal the event queue to the user, but provides access to the top of the event queue for a number of standard event types including mouse buttons.

An event from the pointing device 12 which is inserted as indicated by arrow 250 is designated by a "U" flag in the event type or handle shown by field 258. The "U" flag in field 258 stands for unmodified or original event. The "M" flag in field 258 stands for a modified event. The field 260 contains a "P" to designate pointer events and is blank to designate non-pointer events.

Note that the fields 258 and 260 together are required to determine the operations to be performed. The fields 258 and 260 are preferably incorporated into the event type or handle. In many operating systems supporting pointing devices and windows, the event type or handle contains bit fields not in current use. The field 258 may in such circumstances be preferably incorporated as using one of these unused bit fields.

Pointing device handler 250 will preferably be constrained to generate original, unmodified pointer events which have the field 258 set to the "U" flag state. When the pointing device handler 250 does not force this field into the "U" flag state, an embodiment of this invention in the system may preferably necessitate modification of the pre-existing pointing device handler 250 to achieve this constraint.

Alternatively, when the operating system does not admit to extension of the event type or handle fields in the manner just described, an additional field appended to each pointer event may be preferred. Such an activity will in all probability necessitate the modification of pointing device handler 250 to accommodate this requirement.

Arrow 262 and decision 264 operate together to decide whether the event is a pointer event which is modified or unmodified (original). If the event is not a pointer event, it is not relevant to this invention and will not be discussed beyond saying that it is handled by other event processing operations. If the event is a pointer event and has been modified, it may relate to drawing the cursor, in which case it is used to affect drawing the cursor at the modified cursor coordinates as designated by arrow 266. Modified pointer events may be further processed to effect pushing buttons, etc. in a fashion not central to this invention and as such not discussed beyond this point herein. Unmodified or original pointer events are taken from the event queue and deposited, in a perhaps different format in a second queue as the newest element 272 by an operation designated by arrow 270.

Arrow 262 examines the entire event queue for pointer events in a preferred embodiment of the invention. Alternatively, arrow 262 may preferably examine the top of the event queue.

The second queue progresses as indicated by arrow 274 from newest element 272 entering the queue on the bottom to oldest element 276 at the top of the queue. Arrow 278 designates an operation which examines at least the top element of the second queue and provides the results of its examination to an operation 280 labeled "MODIFY", which generates new cursor coordinates. Arrow 278 further preferably removes elements from the second queue under certain conditions which may occur every time operation 278 is executed, or occasionally when executed.

The operation 280 interrogates a database 282, which contains a collection of at least one region. The regions may further possess sub-regions incorporating one or more induced motion rules. The interaction of operation 280 with database 282 may further alter the contents of database 282 over time.

The operation 280 further preferably interacts in a recurring fashion designated by wraparound arrow 286 regarding the passage of time $\Delta t$ in the system since the last update to the cursor location. If no new pointer event 272 has been received in second queue, then the elements of the second queue, along with the contents of the database 282 may be used to update the cursor location. It may further be preferable to update the contents of the database 282 at such times. Once the new pointer coordinates are calculated, operation 280 may further prefer insertion of a modified pointer event back into the event queue as the newest event 252 as designated by arrow 284.

Figure 14:
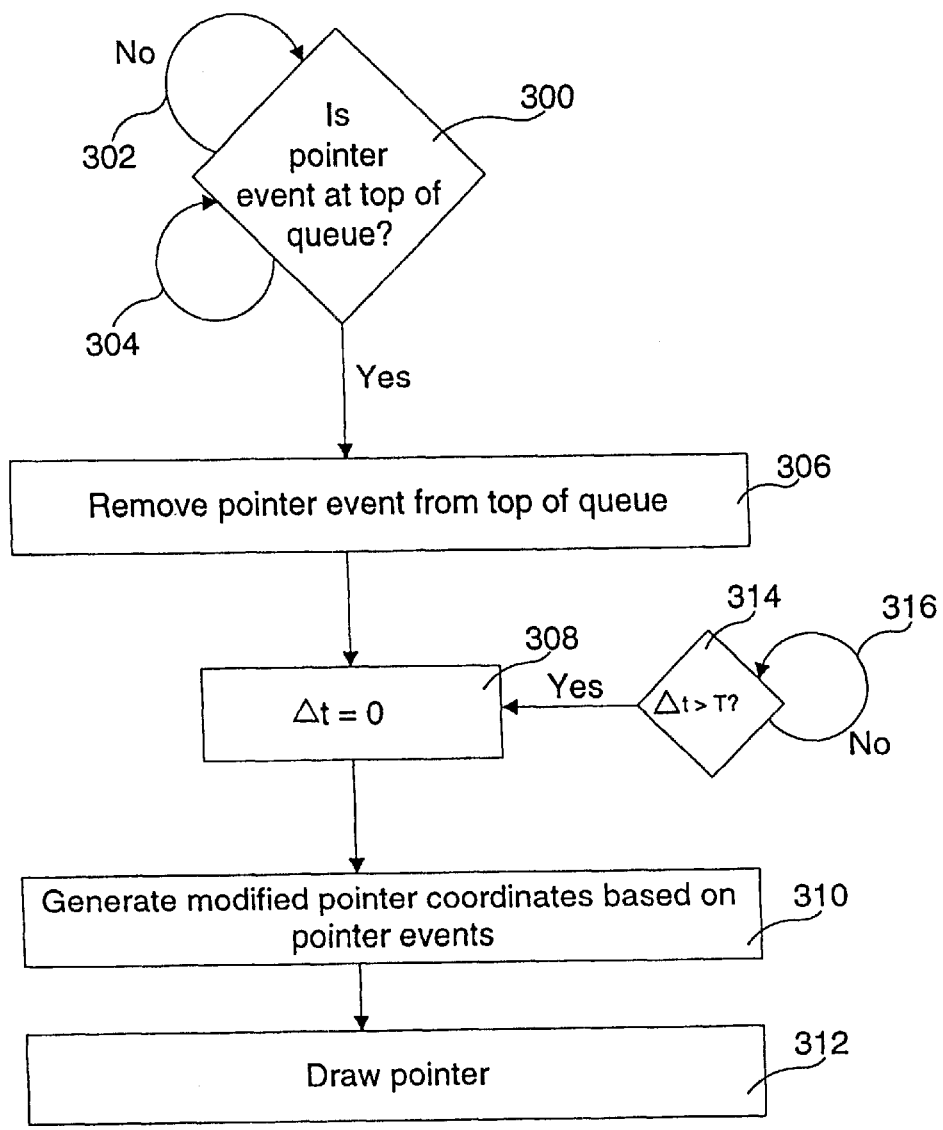
FIG. 14 depicts a high level flowchart of accessing pointer event on an event queue and displaying the pointer at new coordinates in accordance with another embodiment of the invention.

FIG. 14 depicts a high level flowchart accessing pointer events on an event queue and displaying the pointer at new coordinates in accordance with another embodiment of the invention. Operation 300 interrogates the top of the event queue to determine if that event is a pointer event. Wraparound arrow 302 indicates that if the top event queue element is not a pointer event, then at some perhaps later time, the top of the event queue is again interrogates as indicated in operation 300. Wraparound arrow 304 indicates that irrespective of whether the interrogation reveals a pointer event at the top of the event queue, the event queue will again be interrogated at some perhaps later time by operation 300.

If the top of the event queue is a pointer event, then operation 306 removes that pointer event from the top of the event queue. Operation 308 is then performed, causing a time increment $\Delta t$ to be set to 0. As discussed above, there are equivalent alternative mechanisms for doing this. Operation 310 generates modified pointer coordinates based upon pointer events. Operation 312 uses these newly generate pointer coordinates to update the display 10. Operation 312 may further preferably provide higher level event handlers access to new pointer coordinates to processing button pushing and the like.

Note that operation 314 tests to see if the time increment $\Delta t > T$, where T is a predetermined time constant. This operation is repeated in a concurrent fashion as indicated by wraparound arrow 316, perhaps at a slightly later time, when the time increment may have been modified as discussed above. If the time increment $\Delta t$ is greater than the predetermined time constant T, then the sequence of operations starting at 308 and proceeding downward is executed.

Figure 15:
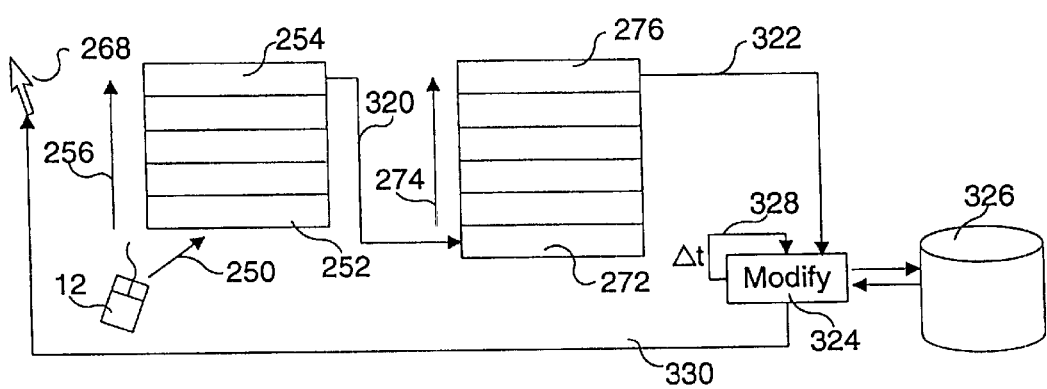
FIGS. 15 and 16 portray two execution processes in accordance with the flowchart of FIG. 14 representing two embodiments of the invention.
Figure 16:
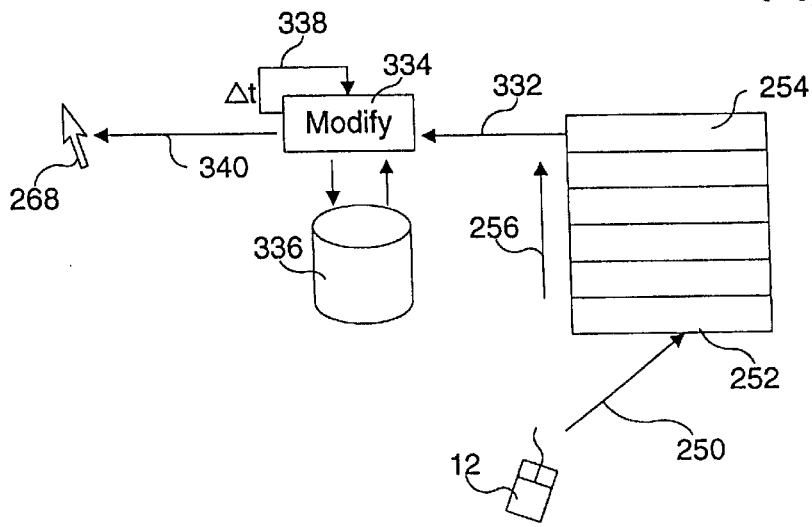

FIGS. 15 and 16 portray two execution processes in accordance with the flowchart of FIG. 14 representing two embodiments of the invention. Both figures utilize a pointing device handler 250, coupled to pointing device 12 and inserting events into a queue at 252 which progress in direction 256 toward the oldest event 254 of the event queue.

FIG. 15 utilizes a second pointer event queue with newest element 272 proceeding in direction 274 toward an oldest element 276. Arrow 320 indicates the removal of a pointer event found on the top of the event queue and insertion of the event as the newest element 272 of the second queue. Arrow 322 interrogates one or more of the top elements of the second queue and reports on these interrogations to operation 324 labeled "MODIFY". Arrow 322 may further preferably remove elements from the second queue each time it is executed. Alternatively, arrow 322 may preferably remove elements from the second queue occasionally.

Operation 324, labeled "MODIFY" is coupled to a database 326 and receives information via arrow 322. Operation 324 generates a modified pointer location based upon the original pointer events, which have been removed from the top of the event queue 254, and from the database 326, which preferably provides information regarding the local window space. The database 326 may preferably provide information about a global screen space. Database 326 may further preferably provide information about at least one virtual space designating location by at least two dimensional vectors. Note that a motion history table for physical pointing device 12 or virtual pointer may preferably be located in one or more of these database 326. Note that an application of this invention may use more than one of such preferred embodiments. Wraparound arrow 328 is associated with checking whether a time increment Δt has exceeded a predetermined value T. Such a situation indicates the passage of time since an update of the cursor location, triggering an update of the cursor location based upon the state of the second queue as reported by 322 and database 326. Note that while arrow 322 depicts a flow from the second queue to operation 324, control and direction of the queue may be preferably asserted from operation 324 in the opposite direction the arrow indicates. Arrow 330 designates incorporating the generated cursor coordinates into the rest of the graphical system, including display and higher level event handling such as buttons, pull-down menus and the other objects instantiated in the particular windowing application system.

FIG. 16 does not utilizes a second pointer event queue. The top of the event queue is interrogated for a pointer event, which if found, is removed from the top of the event stack 254 and sent directly to operation 334 labeled "MODIFY" by arrow 332. Operation 334 generates a modified pointer location based upon the original pointer event removed from the top of the event queue 254 and the database 336, which preferably provides information regarding the local window space. The database 336 may preferably provide information about a global screen space. Database 336 may further preferably provide information about at least one virtual space designating location by at least two dimensional vectors. Note that a motion history table for physical pointing device 12 or virtual pointer may be located in one or more of these database 336 preferred embodiments. Note that an application of this invention may use more than one of such preferred embodiments. Wraparound arrow 338 is associated with checking whether a time increment Δt has exceeded a predetermined value T. Such a situation indicates the passage of time since an update of the cursor location, triggering update of the cursor location based upon database 336. Arrow 340 designates incorporating the generated cursor coordinates into the rest of the graphical system, including display and higher level event handling such as buttons, pull-down menus and the other objects instantiated in the particular windowing application system.

Figure 17:
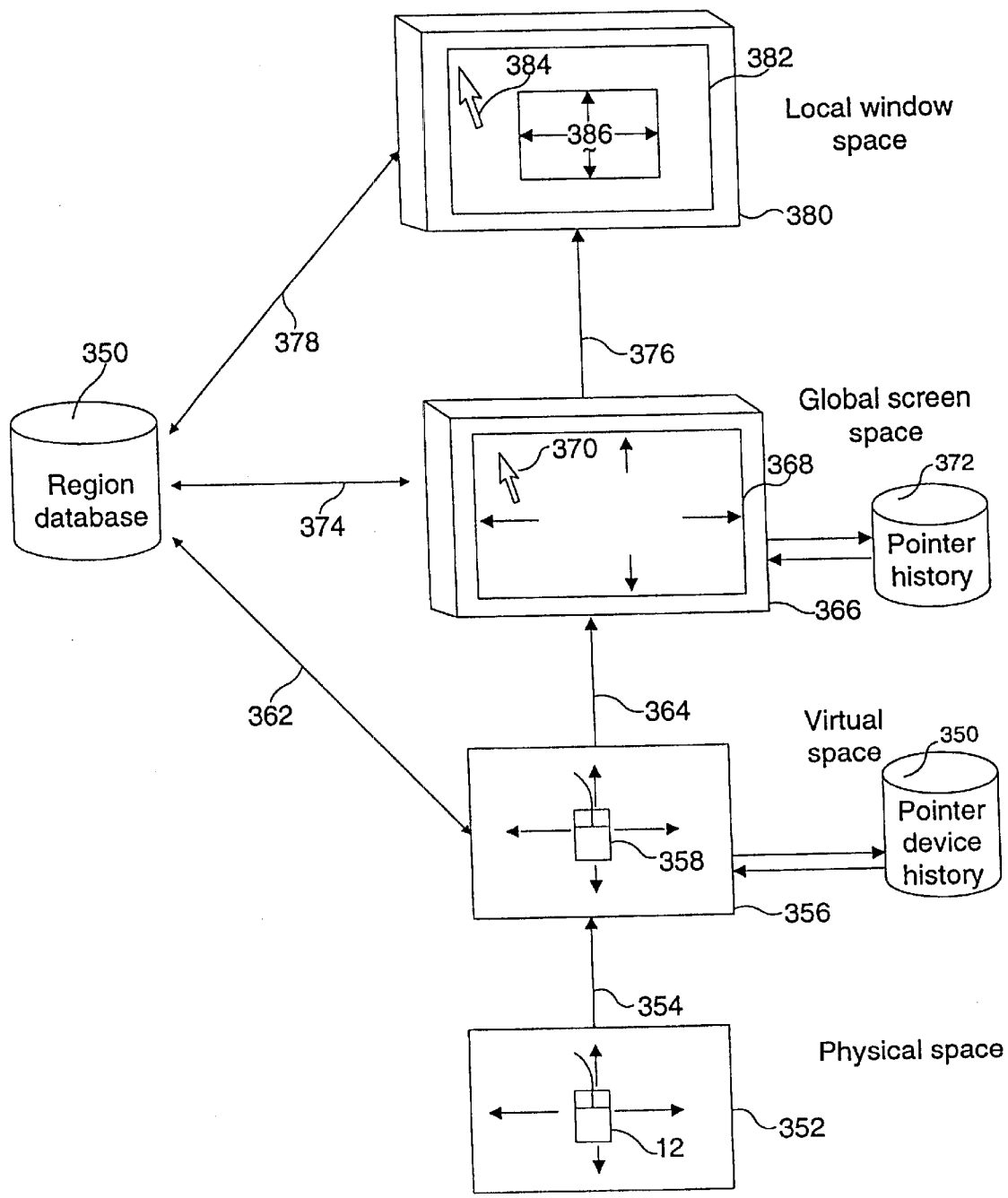
FIG. 17 portrays a virtual region database in accordance with an embodiment of the invention.

FIG. 17 portrays a virtual region database 350 in accordance with an embodiment of the invention. Virtual region database 350 may preferably incorporate at least one virtual space database 356. Virtual region database 350 may also preferably incorporate at least one global screen space database 366. Virtual region database 350 may further preferably incorporate a local window space database 380. Arrow 362 couples virtual region database 350 to virtual space database 356. Arrow 374 couples virtual region database 350 to global screen space database 366. Arrow 378 couples virtual region database 350 to local window space database 380.

Starting from the bottom of FIG. 17, pointing device 12 is moved in the physical space 352. Arrow 354 interfaces the physical space 352 and movement of the pointing device 12 in the physical space 352 with the virtual space 356 and its representation of the virtual pointing device location 358. This virtual space database 356 further preferably contains a pointer device history 360. The pointer device history 360 keeps track of recent past movement of the virtual pointing device 358.

Arrow 364 interfaces the virtual space database 356 and its virtual pointing device location 358 with the global screen space database 366 and its screen pointer 370. The global screen space 366 preferably further incorporates a pointer history database 372. The pointer history database further preferably incorporates the necessary motion information to support inertial effects. Region 368 is a domain of movement for screen pointer 370. Within a region 368 the various sub-regions discussed herein have effect.

Arrow 376 interfaces the global screen space database 366 and its screen pointer 370 with the local window space database 380 and the window space pointer 384. Visible area 382 of the local window space database 380 contains a location where window space pointer 384 preferably resides. Window 386 is an instance of the window class in many object-oriented preferred embodiments. At least one window 386 is preferably associated with a region 368 in the global screen space database 366. Alternatively, visible area 382 is preferably associated with a region 368 of the global screen space database 366.

Note that in certain preferred embodiments, the Physical Space 352 may be the Internet and the pointing device 12 may be embodied additionally as an intelligent agent. Further preferred embodiments may incorporate a Physical Space 352 of one or more Intranets and/or Extranets. Such Intranets and/or Extranets may further preferably incorporate databases, where the intelligent agents 12 move by searching/traversing regions and sub-regions of such databases associated with at least one multi-dimensional coordinate system.

Figures 18, 21A:
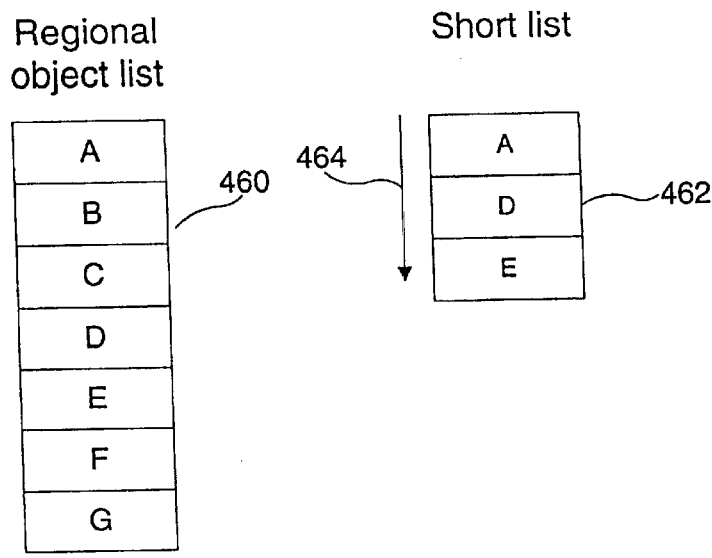
FIG. 18 depicts a collection of optional and required motion rule components of the virtual region database as described in FIG. 17.
FIG. 21A depicts an exemplary regional object list and a representative short list of relevant objects in accordance with an embodiment of the invention as presented by operation 430 in FIG. 21.

FIG. 18 depicts a collection of optional and required motion rule components of the virtual region database as described in FIG. 17. There are three columns to the table. The first column designates a particular kind of motion, which is the subject of its row in the table. The second column is composed of two sub-columns, the device history and pointer history. The third column relates to regions and objects within regions.

The first row discusses General Friction, which may optionally incorporate or be incorporated in the Device History, Pointer History as well as the Region Objects. Directional Friction is discussed in the second row. Either or both Device History and Pointer History is required to perform this operation. Region Objects are optional for implementing this operation. Inertia is discussed in the third row. Either or both Device History and Pointer History is required to perform this operation. Region Objects are optional for implementing this operation. Velocity is discussed in the fourth row. Either or both Device History and Pointer History may be optionally used or incorporate parameters related to this operation. Region Objects are optional for implementing this operation. Acceleration is discussed in the fifth row. Either or both Device History and Pointer History is required to perform this operation. Region Objects are optional for implementing this operation. Magnetism is discussed in the third row. Either or both Device History and Pointer History is required to perform this operation. Region Objects are also required for implementing this operation, since magnetism requires a magnetic object, whether a point, line, plane or other object from which to compute the attraction or repulsion.

Figure 19:
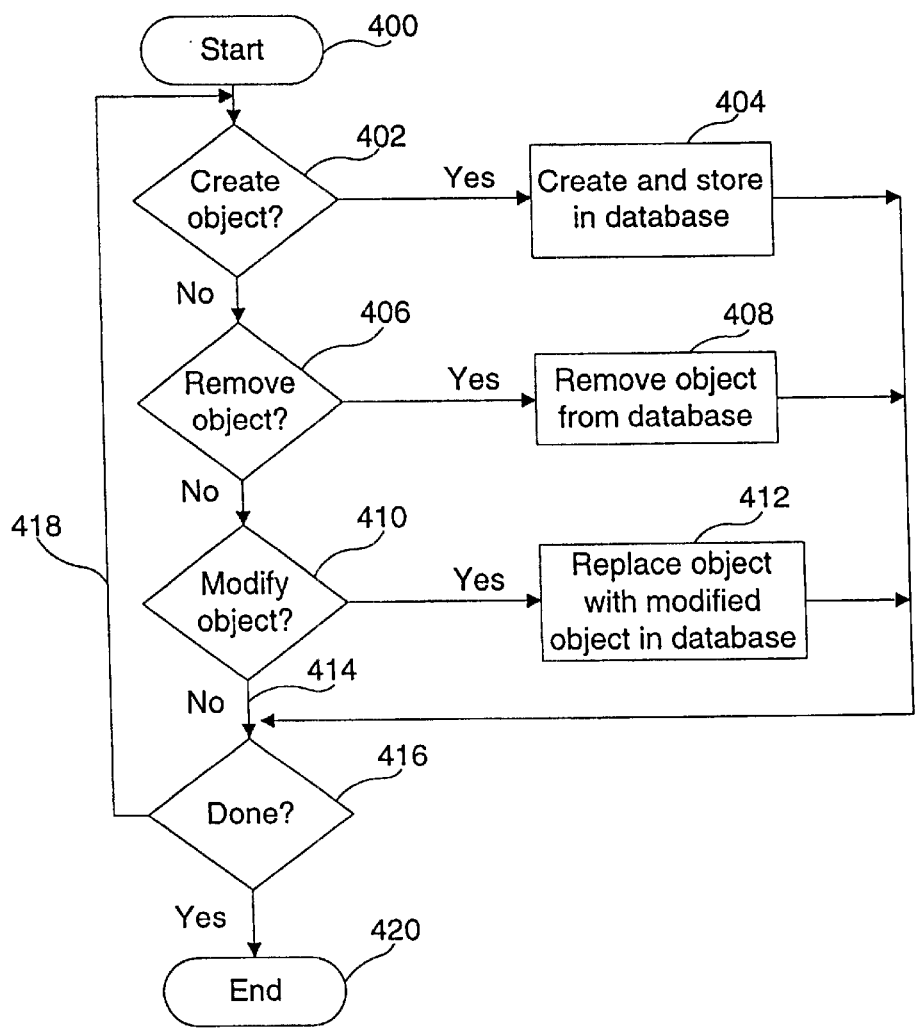
FIG. 19 depicts an object management flowchart in accordance with the sub-region database in accordance with an embodiment of the invention.

FIG. 19 depicts an object management flowchart in accordance with the sub-region database in accordance with an embodiment of the invention. Note that the are multiple preferred embodiments regarding who or what performs these operations. They may be performed once by an application developer before the software has become a user interface. They may be performed by a software tool which interrogates an existing program and determines which elements, such as buttons within which windows should be given induced motion rules and then incorporates those induced motion rules and a preferred embodiment as previously disclosed into the application and the operating system environment in which it is run. Another preferred embodiment uses software agents to interrogate a database, one or more Intranets or the Internet using some coordinate system to at least organize the presentation of such interrogations, further deriving objects based upon criteria or rules specified by either a higher level, software or algorithmic controlling agent or a user.

Operation 400 starts this object manager. In various embodiments, this may involve opening various files, creating specific directories and possibly initializing various object links. Note that in some object oriented environments such as Java, objects are referenced not by pointers to memory locations, but by attributes known as handles which are contained in class instance tables. Other preferred embodiments in languages such as C++ reference object by memory references. Note that these and other divergent implementation details will not be discussed hereafter. They are mentioned here by way of illustration, that the invention's scope encompasses references to object by these and other equivalent mechanisms, including memory references offset from the first or last memory location involved in the object.

Operation 400 either collects object manager requests or is presented with a collection of object manager requests. A first object manager request is selected. Operation 402 examines the selected object manager request to determine if an object is to be created. If such a request is found, operation 404 creates the requested object in the object database. Once completed, the flow of control proceeds to arrow 414, leading to determining if there are more object manager requests by operation 416. In certain preferred embodiments, operation 402 may examine the region object database to confirm that the object creation being requested does not violate any consistency rules of the database. In certain further preferred embodiments, operation 404 may interrogate the region object database to further determine whether the object has been successfully created. In further preferred embodiments failures, inconsistencies and errors associated with the region object database may be reported by either or both of operations 402 and 404. In certain further preferred embodiments, these reports may be appended to a log of such things.

Operation 406 is performed if the selected object manager request is not an object creation request. Operation 406 determines if the selected object manager request is to remove an object from the object database. If an object removal request is to be performed, operation 408 is performed, removing the object. In certain preferred embodiments of the invention, operation 406 may further interrogate the object database to confirm the object exists in the database, and operation 408 is only performed when there is a request for removing an existent object. In certain further preferred embodiments, operation 406 or 408 may be implemented to account for the removal of a non-existent object by generating an error report, preferably appended to an operational log. Once completed, the flow of control proceeds to arrow 414, leading to determining if there are more object manager requests by operation 416. In further preferred embodiments, access privileges regarding the removal of objects may be used. In still further preferred embodiments, access privileges may be hierarchical. This is particular useful in circumstances where one or more software agents progressively collect such an object database.

Operation 410 is performed if the selected object manager request is not an object removal request. Operation 410 determines if the selected object manager request is to modify an object. If an object modification request is to be performed, operation 412 is performed, modifying the object in the object database. In certain preferred embodiments, the original object is removed from the object database and a modified version of the object replaces the removed original version of the object. In certain other preferred embodiments, the original version of the object is modified in place within the object database without being first removed. Also, in certain preferred embodiments, operation 410 further interrogates the object database to insure that the object to be modified exists. In certain other embodiments, operation 412 interrogates the object database, and if the object exists, modifies it in the manner described above. In certain further preferred embodiments, operation 410 or 412 may be implemented to account for the modification of a non-existent object by generating an error report, preferably appended to an operational log. Once completed, the flow of control proceeds to arrow 414. In further preferred embodiments, access by other entities while modification of an object is being performed may be restricted, or locked out. Such access restriction is particularly useful in concurrent environments where multiple entities may be accessing the object database at essentially the same time.

In certain further preferred embodiments, more than one kind of object modification may be requested. Further preferred embodiments may incorporate object modification requests which are not appropriate on certain objects, but which are appropriate on other objects within such an object database. In such preferred embodiments, operation 410 may interrogate the object database not only to determine if the object exists, but also whether the modification is appropriate for the object, and only if it is appropriate, perform operation 412. In certain other preferred embodiments, interrogation of the appropriateness of the requested modification may be performed by operation 412. In certain further preferred embodiments, operation 410 or 412 may be implemented to account for the inappropriate modification of an object by generating an error report, preferably appended to an operational log.

Arrow 414 is a common point preceding to a test of whether there are more object management requests to be performed as indicated by operation 416. Arrow 418 is the control path followed if there are more object manager requests to be performed. It also acts to select which object manager request to consider next.

If there are not additional object manager requests to be performed, operation 420 ends the object manager operations. In certain preferred embodiments, one or more of the following may be done: closing files, locking or write protecting specific memory or file components, possibly with password protection.

Note that this flowchart and its discussion has been entered by way of illustration and is not intended to limit the scope of the invention. In particular, the ordering of the determinations 402, 406 and 410 is by way of example. As should be apparent to anyone of skill in the art, such as ordering is arbitrary, any other ordering would be equivalent.

Further, operation pair 402 and 404, operational pair 406 and 408 and operational pair 410 and 412, may be preferably implemented as a collection of such operational pairs for differing types of object. These differing types of objects may possibly include but are not limited to one or more of the following: regions, sub-regions, bounding boxes, possibly of various types, and of various dimensions. Operations 410 and 412 may further preferably implemented as a collection of such operational pairs modifying differing components of objects or object types. Note that these operational pairs may be concurrently executing, with the relevant locking and unlocking of access to objects for modification, removal and creation.

Figure 20:
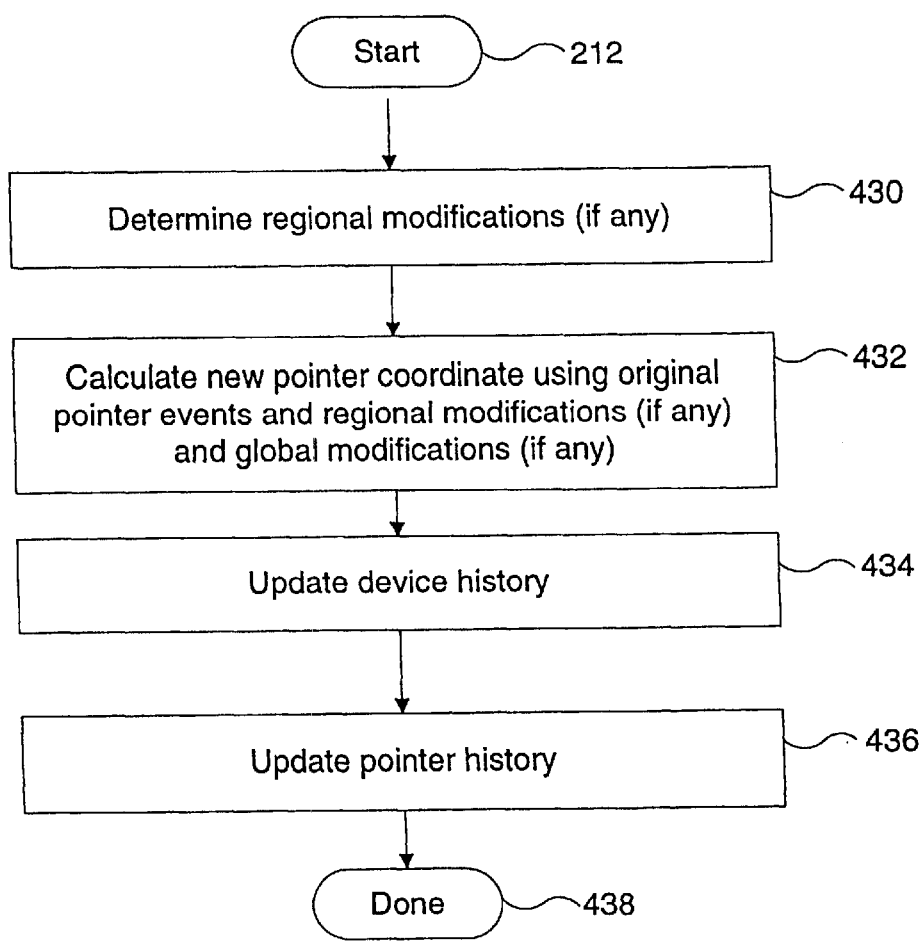
FIG. 20 depicts a detail flowchart of operation 212 of the flowchart of FIG. 12 in accordance with an embodiment of the invention.

FIG. 20 depicts a detail flowchart of operation 212 of the flowchart of FIG. 12 in accordance with an embodiment of the invention. Operation 212 starts by performing initialization. Operation 430 determines if there are regional modifications to the pointer motion required. One preferred embodiment of operation 430 will be described in greater detail in FIG. 21. Further discussion of this operation will be deferred until then.

Operation 432 preferably calculates the new pointer coordinates using a collection including but not limited to at least one of the set of original pointer events, regional modifications (if any), and global modifications (if any). A further preferred embodiment incorporates calculating new pointer coordinates using the original pointer events, regional modifications (if any) and global modifications (if any). Operation 432 will be discussed in greater detail in the flowchart of FIG. 22, and as such, further discussion of preferred embodiments will be postponed till then.

Operation 434 updates the device history 360 based upon the removed pointer events from operation 210 of FIG. 12. Operation 436 updates the pointer history 372 based upon the calculated new pointer coordinates generated by operation 432 above. Operation 438 completes the flowchart and operations incorporated into operation 212. In certain preferred embodiments, operation 212 temporarily owns certain allocated system resources, which are freed up for other uses in operation 438.

Figure 21:
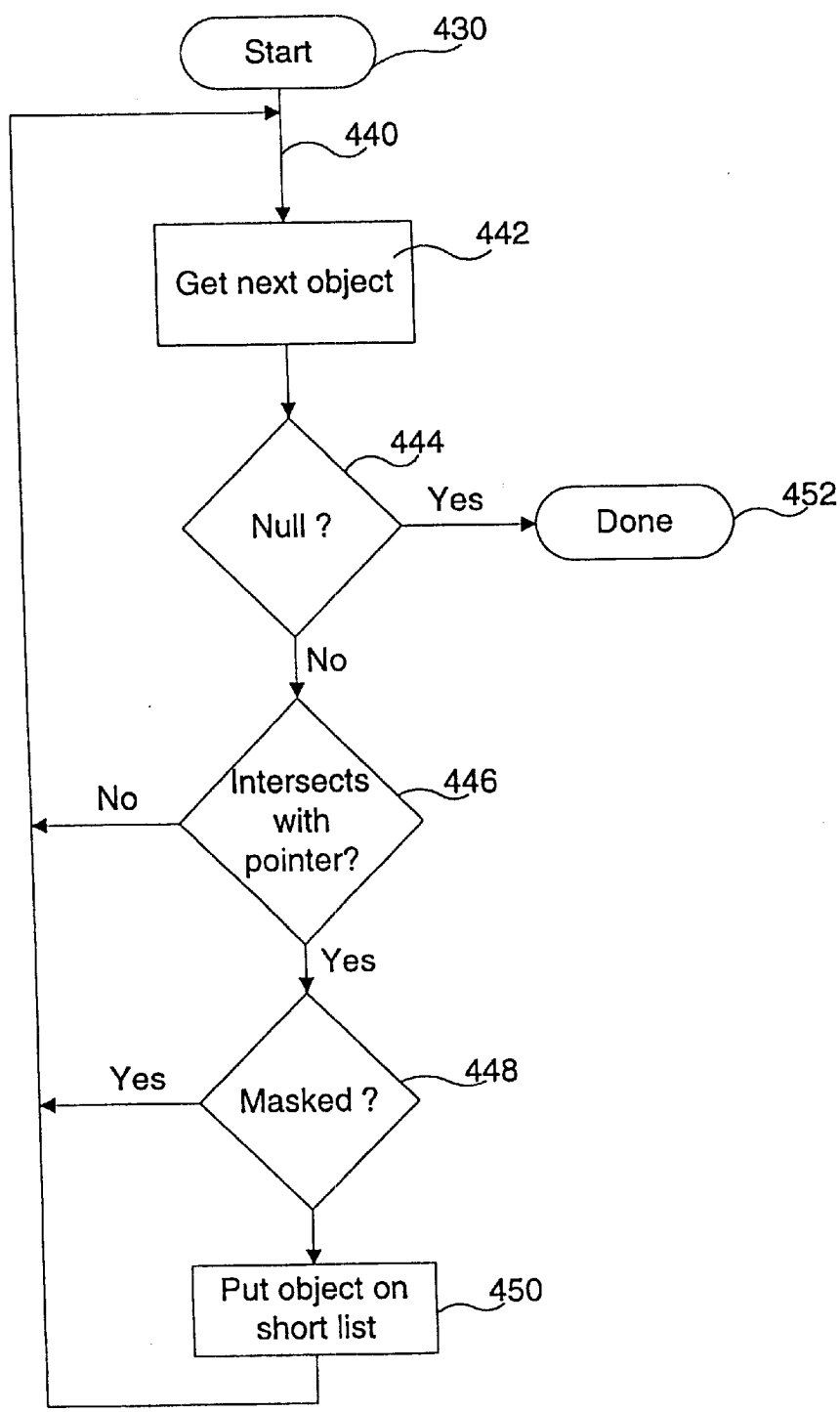
FIG. 21 depicts a detail flowchart of operation 430 of the flowchart of FIG. 20 in accordance with an embodiment of the invention.

FIG. 21 depicts a detail flowchart of operation 430 of the flowchart of FIG. 19 in accordance with an embodiment of the invention. Operation 430 in some preferred embodiments begins by allocating and initializing certain system resources, which may include but are not limited to one or more of RAM, content addressable memory, and advanced pipelined graphical engines, which may further preferably incorporate Z buffers. For the sake of discussion, consider the regional object list 460 to simply be a list of regional objects.

Arrow 440 designates a point where execution of these operations loops back to process the next object. Operation 442 gets the next object. Note again, this invention incorporates both sequential and concurrent processing of the objects of the regional object list. Getting a next object in operation 442 is by way of illustration and is not meant to imply that the objects have a predetermined order.

Operation 444 determines if there is an unexamined object left in the regional object list. If operation 444 finds a null, that is a way of saying that there are no more objects to be examined in the regional object list. If operation 444 does not find a null, execution continues in operation 446.

Operation 446 examines the next object found by operation 442 to determine if the object intersects with the pointer location. If the object does not intersect with the pointer location, then execution continues with arrow 440 as discussed above.

If the object does intersect with the pointer location, then execution continues at operation 448. Operation 448 examines the object which has been found to intersect with the pointer location to determine if it has been masked in certain preferred embodiments. If the object has been masked, execution continues at arrow 440 as discussed above. In other preferred embodiments, this operation may not be performed. If the operation has not been embodied, or if embodied, the object is not masked, then operation 450 is performed. Operation 450 puts the object on the short stack as illustrated in FIG. 21A above.

This sequence of operations is iterated until operation 444 determines that the next pointer is null, indicating that the regional object list no longer contains an unexamined object. At such a point, operation 452 is performed, which releases any temporary systems resources in some preferred embodiments of the invention.

FIG. 21A depicts an exemplary regional object list and a representative short list of relevant objects in accordance with an embodiment of the invention as presented by operation 430 in FIG. 21. FIG. 21 discloses a sequence of operations, which when presented with a regional object list 460, determines a short list 462 of objects which are relevant to the motion of the pointer, given its location. Note that all the elements of the short list 462 are present in the regional object list 460. An ordering 464 is preferably associated with the short list 462, so that there is a first element (A), a successor element (D), etc. In some preferred embodiments, there is no ordering associated with the regional object list. In certain other preferred embodiments, there is an ordering associated with the regional object list, which may be linear or multidimensional. Alternatively, rather than an ordering, a relative weighting may be used to imply or depict a linear or multidimensional association.

Figure 22:
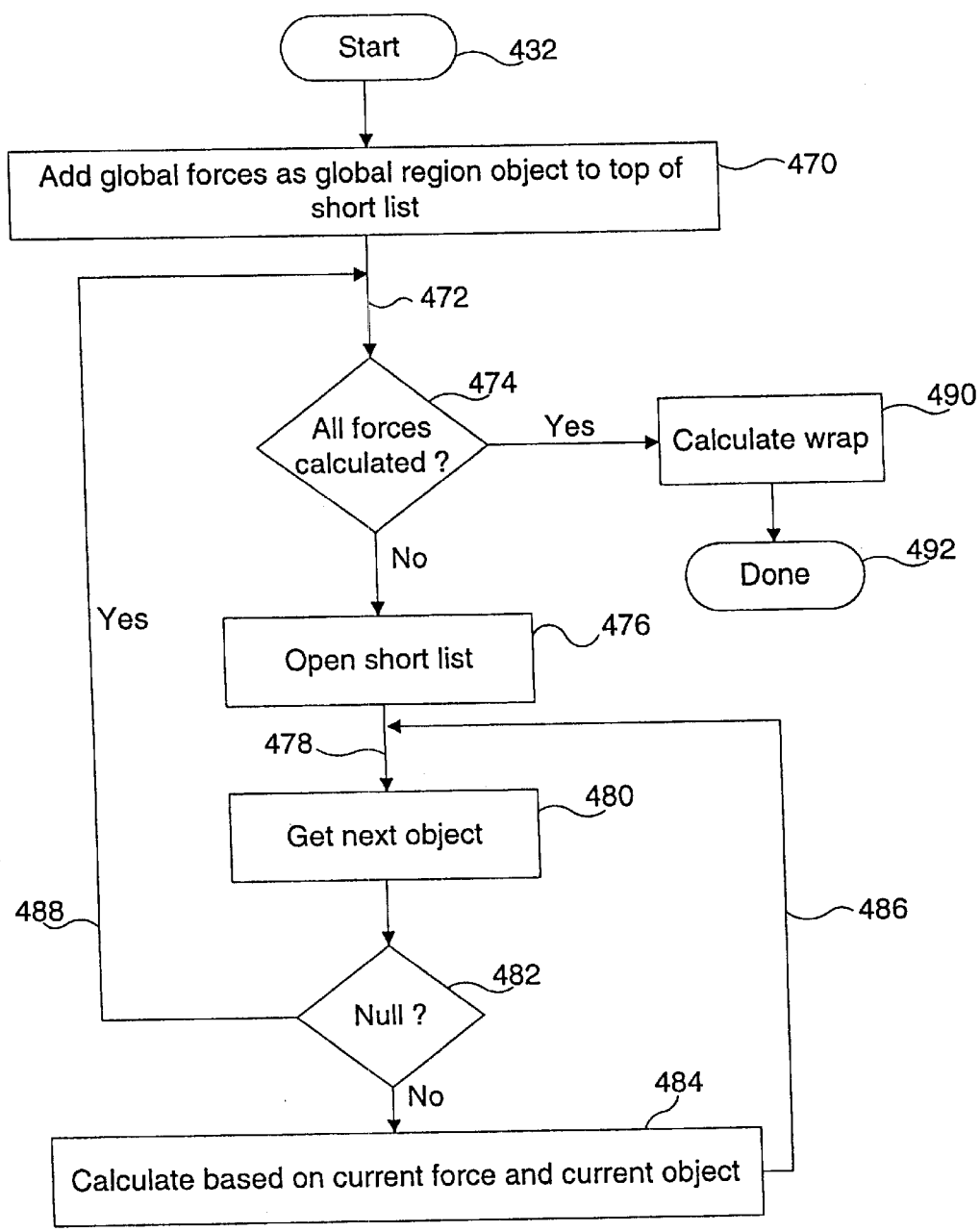
FIG. 22 depicts a detail flowchart of operation 432 of the flowchart of FIG. 20 in accordance with an embodiment of the invention.

FIG. 22 depicts a detail flowchart of operation 432 of the flowchart of FIG. 20 in accordance with an embodiment of the invention. Operation 432 begins with operation 470 adding global forces as a global region object to the top of the short list. It also selects one of the forms of force or induced motion to calculate first. Arrow 472 is the first iterating point in this flowchart.

Operation 474 determines if all the forces have been calculated. If there are more forces to be calculated, operation 476 opens the short list to be used. Arrow 478 is the second iterating point of this flowchart.

Operation 480 gets the next object of the short list. Note that this operation, in certain preferred embodiments, does not perform the same operation as operation 442 of FIG. 21. Operation 422 is traversing all regional objects, whereas operation 480 is traversing the short list.

Operation 482 determines if the next object gotten from the short list is null or not. If it is null, then there are no more objects to consider within the short list and arrow 488 selects the next force to be calculated and execution continues at first iteration point 472.

If the object is not null, or equivalently, if there remains an object on the short list which has not been examined for the effect of the current type of force, operation 484 is performed. Operation 484 calculates the induced motion effect on the pointer of the current force and the current object from the short list. Once this operation has been completed, arrow 486 brings the execution back to arrow 478.

Operation 490 determines whether the cursor is at the boundary of the sub-region and whether there is wrap around to another boundary of the sub-region. Operation 492 cleans up the systems resources, possibly releasing allocated resources that this flowchart used.

Figure 23:
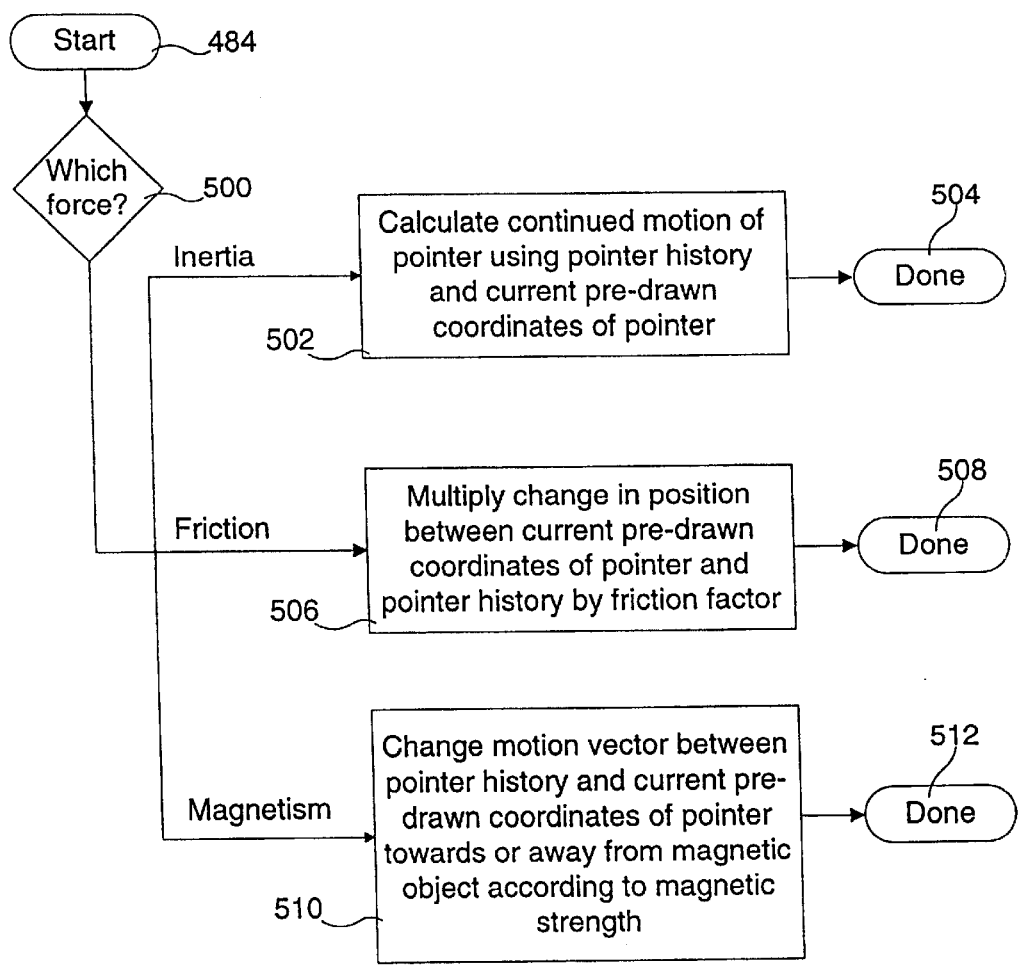
FIG. 23 depicts a detail flowchart of operation 484 of the flowchart of FIG. 22 in accordance with an embodiment of the invention.

FIG. 23 depicts a detail flowchart of operation 484 of the flowchart of FIG. 22 in accordance with an embodiment of the invention. Operation 500 determines which type of force is being examined. In some preferred embodiments, this includes but in not limited to at least one of inertia, friction or magnetism, or computational motion similar to one or more of these.

If inertia is being calculated, operation 500 directs execution to operation 502. Operation 502 calculates the continued pointer motion using pointer history 372 and current pre-drawn pointer coordinates. Once this operation is completed, operation 504 exits this flowchart.

If friction is being calculated, operation 500 directs execution to operation 506. Operation 506 multiplies the change in position between current pre-drawn pointer coordinates and the pointer history. An earlier discussion of incremental velocity is relevant here. Once this operation is completed, operation 508 exits this flowchart.

If magnetism is being calculated, operation 500 directs execution to operation 510. Operation 510 change the motion vector between current pre-drawn pointer coordinates and the pointer history towards or away from the magnetic object according to its magnetic strength. Once this operation is completed, operation 512 exits this flowchart.

Note that in certain preferred embodiments, the pointer device history may be used instead of the pointer history as discussed above for FIGS. 22 and 23. In certain further preferred embodiments, both the pointer device history as well as the pointer history are used as discussed above for FIGS. 22 and 23.

APPENDIX

XOI: XtraOrdinary Interactions Command Summary

DISCRETE POSITIONING METHODS:

| Function name | Operation(s) performed |
| --- | --- |
| xoiGetCursorX | Returns current x position of visible cursor |
| xoiGetCursorY | Returns current y position of visible cursor |
| xoiSetCursorXY (int x, int y) | Jumps visible cursor to screen position |
| xoiSetCursorXYDampened (int x, int y) | Jumps visible cursor to screen position and dampens inertia |
| xoiSetCursorCouple (int cc) | Toggles input device cursor mapping: 0 = decoupled 1 = coupled (determines whether cursor moves in response to input device) |
| xoiGetDeviceX | Returns absolute x position of input device |
| xoiGetDeviceY | Returns absolute y position of input device |

DIRECTIONAL MOVEMENT METHODS:

| Function name | Operation(s) performed |
| --- | --- |
| xoiGetCursorVector | Returns instantaneous vector of visible cursor |
| xoiGetCursorVelocity | Returns instantaneous velocity of visible cursor |
| xoiGetCursorAccel | Returns instantaneous acceleration of visible cursor |
| xoiGetDeviceVector | Returns instantaneous vector of input device |
| xoiGetDeviceVelocity | Returns instantaneous velocity of input device |
| xoiGetDeviceAccel | Returns instantaneous acceleration of input device |

APPENDIX-continued

XOI: XtraOrdinary Interactions Command Summary

| | |
| --- | --- |
| xoiConstrainAxis (int vector, int range) | Constrains all movement in range of specified vector to that axis |
| xoiFreeAxes | Removes all axis constraints |

OBJECT PROPERTY MANIPULATION:

| Function name | Operation(s) performed |
| --- | --- |
| Get (str objectName) | Returns the value of the property with name for the named Object Ex. GetObjectName("redRectangle") returns "redRectangle" |
| Set (str objectName, int/str value) | Sets the value of the property with name for the named object to value Ex. SetFrictionForce("redRectangle",50) - Sets the frictionForce property of "redRectangle" to 50 |

FORCE PROCESSING METHODS

| Function name | Operation(s) performed |
| --- | --- |
| XoiInstall | Installs persistent input device processing thread |
| XoiRemove | Removes processing thread and frees memory |
| XoiSetObject (str objectName, int boundsLeft, int boundsTop, int boundsRight, int boundsBottom, int boundsShape, str boundsBitmapMemberName, int boundsMasking, int boundsBlockWrapLeft, int boundsBlockWrapTop, int boundsBlockWrapRight, int boundsBlockWrapBottom, int frictionBehavior, int frictionSlope, int frictionForce, int magnetismLeft, int magnetismTop, int magnetismRight, int magnetismBottom, int magnetismInsideShape, int magnetismDecayX, int magnetismDecayY, int magnetismForceInbound, int magnetismForceOutbound) | Sets values for named object and adds to processing queue (if object already in queue, then replaces property values) |
| xoiRemoveOneObject (str objectName) | Removes object from processing queue |
| xoiRemoveAllObjects | Removes all objects from processing queue |
| xoiGetInertia | Returns global inertia setting: 0 = Off 1 = On |
| xoiSetInertia (int inertia) | Toggles global inertia setting: 0 = Off 1 = On |
| xoiDampenInertia | Nullify accumulated inertia |

XOI OBJECT PROPERTIES:

| Property name | Meaning or Use |
| --- | --- |
| str objectName | name of object |
| int boundsLeft | left edge of object |
| int boundsTop | top edge of object |
| int boundsRight | right edge of object |
| int boundsBottom | bottom edge of object |
| int boundsShape | 0 = rect 1 = oval 2 = bitmap |
| str boundsBitmapMemberName | name of bounding bitmap |
| int boundsMasking | 0 = transparent 1 = block background forces |

APPENDIX-continued

XOI: XtraOrdinary Interactions Command Summary

| | | |
|---|---|---|
| int boundsBlockWrapLeft | 0 = free 1 = block 2 = wrap | |
| int boundsBlockWrapTop | 0 = free 1 = block 2 = wrap | |
| int boundsBlockWrapRight | 0 = free 1 = block 2 = wrap | |
| int boundsBlockWrapBottom | 0 = free 1 = block 2 = wrap | |
| int frictionBehavior | 0 = uniform 1 = unidirectional 2 = bidirectional | |
| int frictionSlope | on-screen angle: 0 to 360 degrees | |
| int frictionForce | resistance: −100 to +100 (hot gas to solid form) | |
| int magnetismLeft | left edge of safe zone | |
| int magnetismTop | top edge of safe zone | |
| int magnetismRight | right edge of safe zone | |
| int magnetismBottom | bottom edge of safe zone | |
| int magnetismInsideShape | safe zone shape: 0 = rect 1 = oval | |
| int magnetismDecayX | Horiz. distance from center to 0 magnetic force | |
| int magnetismDecayY | Vert. distance from center to 0 magnetic force | |
| int magnetismForceInbound | inbound force: −100 to +100 (push to pull) | |
| int magnetismForceOutbound | outbound force: −100 to +100 (push to pull) | |

What is claimed is:

1. A method for controlling a pointer in an operating system having an event queue comprising:

examining said event queue for original pointer events generated by a pointing device;

removing said original pointer events from said event queue;

generating new pointer events based upon said original pointer events;

inserting said new pointer events into said event queue;

maintaining a second event queue; and inserting said original pointer events into said second event queue upon removing said original pointer events from said event queue;

removing said original pointer event from said second event queue upon generating new pointer event based upon said original pointer events;

wherein the entire event queue is examined for pointer events;

wherein generating new pointer events based upon said original pointer events uses at least two of said original pointer events in said second event queue;

wherein generating new pointer events based upon said original pointer events further includes calculating an incremental velocity using at least two of said original pointer events in said second event queue;

wherein generating new pointer events based upon said original pointer events further includes:

maintaining a third event queue;

inserting said incremental velocity into one velocity event; and inserting said velocity event into said third event queue;

maintaining a graphical object list including a graphical object further comprised of a geometry and at least one induced motion rule;

wherein generating new pointer events based upon said original pointer events also is based upon said graphical object list;

wherein generating new pointer events based upon said original pointer events also is based upon said geometry of said graphical object of said graphical object list;

wherein generating new pointer events based upon said original pointer events is based upon applying said induced motion rules of said graphical object to pointer coordinates of said original pointer event if said pointer coordinates of said original pointer event are within said geometry;

wherein said geometry of said graphical object includes a bounding box; and wherein generating new pointer coordinates based upon said original pointer events is based upon said pointer coordinates of said original pointer event and said induced motion of said graphical object if said pointer coordinates of said original pointer event are within said bounding box.

* * * * *

UNITED STATES PATENT AND TRADEMARK OFFICE
CERTIFICATE OF CORRECTION

| | |
|---|---|
| PATENT NO. | : 6,583,782 B1 |
| APPLICATION NO. | : 09/488616 |
| DATED | : June 24, 2003 |
| INVENTOR(S) | : Eric J. Gould et al. |

Page 1 of 1

It is certified that error appears in the above-identified patent and that said Letters Patent is hereby corrected as shown below:

Title Page:

(75) Inventors:
Please delete "Paulus W. Risnadi" and substitute -- Paulus W. Trisnadi --.

Signed and Sealed this

Sixteenth Day of March, 2010

David J. Kappos
*Director of the United States Patent and Trademark Office*